(12) United States Patent
Rozot

(10) Patent No.: US 11,110,625 B2
(45) Date of Patent: Sep. 7, 2021

(54) SYSTEMS AND METHODS FOR CUTTING MATERIALS

(71) Applicant: Thierry Rozot, Valparaiso, IN (US)

(72) Inventor: Thierry Rozot, Valparaiso, IN (US)

( * ) Notice: Subject to any disclaimer, the term of this patent is extended or adjusted under 35 U.S.C. 154(b) by 181 days.

(21) Appl. No.: 16/215,801

(22) Filed: Dec. 11, 2018

(65) Prior Publication Data

US 2019/0118400 A1   Apr. 25, 2019

Related U.S. Application Data

(62) Division of application No. 15/256,139, filed on Sep. 2, 2016.

(Continued)

(51) Int. Cl.
| | |
|---|---|
| *B23K 7/00* | (2006.01) |
| *B23K 7/10* | (2006.01) |
| *B23K 37/08* | (2006.01) |
| *B26D 7/01* | (2006.01) |
| *B23K 7/06* | (2006.01) |
| *B23K 37/02* | (2006.01) |
| *B23K 26/38* | (2014.01) |
| *B23K 28/02* | (2014.01) |
| *B23P 23/02* | (2006.01) |
| *B24B 9/04* | (2006.01) |

(Continued)

(52) U.S. Cl.
CPC ............... *B26D 7/01* (2013.01); *B23K 7/001* (2013.01); *B23K 7/002* (2013.01); *B23K 7/06* (2013.01); *B23K 7/10* (2013.01); *B23K 26/38* (2013.01); *B23K 28/02* (2013.01); *B23K 37/0235* (2013.01); *B23K 37/08* (2013.01); *B23P 23/02* (2013.01); *B24B 9/04* (2013.01); *B24C 1/006* (2013.01); *B26F 3/004* (2013.01); *B23K 2103/04* (2018.08)

(58) Field of Classification Search
None
See application file for complete search history.

(56) References Cited

U.S. PATENT DOCUMENTS 6,277,322 B1 * 8/2001 Lotz .................. B22D 11/1265
266/48
7,806,029 B2 * 10/2010 Rozot .................. B23K 26/032
83/13

(Continued)

*Primary Examiner* — Scott R Kastler
(74) *Attorney, Agent, or Firm* — Hartman Global IP Law; Gary M. Hartman; Domenica N.S. Hartman

(57) ABSTRACT

Systems and methods suitable for cutting a material and deburring devices for performing a deburring operation on an edge of the material. Such a system includes a frame and table systems supported by the frame. Each table system includes a table for supporting the material and each table system is independently movable relative to the frame in lateral directions. A first carriage unit and second carriage units are supported by the frame and independently operable to travel in a travel direction transverse to the lateral directions. The first carriage unit includes multiple cutting devices, and the second carriage units includes multiple deburring devices. Each cutting device operates in conjunction with a corresponding one of the deburring devices, and the cutting and deburring devices are independently operable to cause the cutting devices and the deburring devices to simultaneously travel in the travel direction.

20 Claims, 30 Drawing Sheets

Related U.S. Application Data

(60) Provisional application No. 62/214,951, filed on Sep. 5, 2015.

(51) Int. Cl.
    *B24C 1/00*    (2006.01)
    *B26F 3/00*    (2006.01)
    *B23K 103/04*    (2006.01)

(56) References Cited

U.S. PATENT DOCUMENTS

| | | | |
|---|---|---|---|
| 8,402,868 B2 * | 3/2013 | Rozot | B23K 26/38 83/13 |
| 2017/0129119 A1 * | 5/2017 | Rozot | B26F 3/004 |

* cited by examiner

SYSTEMS AND METHODS FOR CUTTING MATERIALS

CROSS REFERENCE TO RELATED APPLICATIONS

This is a division patent application of U.S. patent application Ser. No. 15/256,139, filed Sep. 2, 2016, which claims the benefit of U.S. Provisional Application No. 62/214,951, filed Sep. 5, 2015. The contents of these prior which are incorporated herein by reference. In addition, this application is related to U.S. Pat. Nos. 7,806,029 and 8,402,868, which claim the benefit of U.S. Provisional Application No. 60/691,357, filed Jun. 17, 2005. The contents of these prior applications are incorporated herein by reference.

BACKGROUND OF THE INVENTION

The invention relates to systems and methods for shaping material.

Steel slabs of material can be shaped using a variety of equipment and techniques (such as slitting, cutting, etc.). Such equipment, hereinafter referred to collectively as slab shaping systems or simply shaping systems, include equipment employed to cut or slit slabs into narrower strips in preparation for use or shipment. U.S. Pat. Nos. 7,806,029 and 8,402,868 disclose shaping systems that overcome various drawbacks associated with previous shaping systems and methods, such as the inclusion of a deburring device that removes burrs along the edges of a cut or slit formed during a shaping operation. Nonetheless, there is an ongoing need for shaping systems and methods capable of facilitating certain aspects of shaping operations of the type that may be performed on slabs of material. As a particular example, there is an ongoing need to improve the effectiveness of the deburring operation in order to more consistently remove burrs.

BRIEF DESCRIPTION OF THE INVENTION

The present invention provides systems and methods capable of shaping and cutting materials, including slabs of steel.

According to one aspect of the invention, a system for cutting a material includes a frame, table systems supported by the frame and each comprising a table for supporting the material and means for independently moving the table systems relative to the frame in lateral directions, and at least a first carriage unit and second carriage units supported by the frame and independently operable to travel in a travel direction transverse to the lateral directions. The first carriage unit comprises an arm, multiple cutting devices independently movable along the arm, and means for moving the arm in the travel direction. Each second carriage unit comprises an arm, a deburring device coupled to the arm, and means for moving the deburring device in the travel direction. Each cutting device is operated in conjunction with a corresponding one of the deburring devices. The means for moving the arm of the cutting devices and the means for moving the arms of the deburring devices are independently operable to cause the cutting devices and the deburring devices to simultaneously travel in the travel direction. The first and second carriage units position the cutting devices and the deburring devices to simultaneously perform multiple cutting and deburring operations, respectively, from opposite surfaces of the material supported on the tables while the deburring devices are behind the cutting devices relative to the travel direction.

Another aspect of the invention is a method of cutting a material using a system comprising the elements described above.

Yet another aspect of the invention is a deburring device adapted for performing the deburring operation of a system comprising the elements described above.

Technical effects of the system, method, and device described above preferably include the ability to perform a cutting or slitting operation on a slab or material with improved effectiveness of the concurrent deburring operation in order to more consistently remove burrs. Additional aspects of certain nonlimiting embodiments of the invention include the ability to perform multiple cutting and deburring operations simultaneously on a slab of material, and/or provide means for efficient removal and cleaning of debris collected during the cutting or slitting operation.

Various aspects and advantages of this invention will be appreciated from the following detailed description.

DETAILED DESCRIPTION OF THE INVENTION

Figure 1:
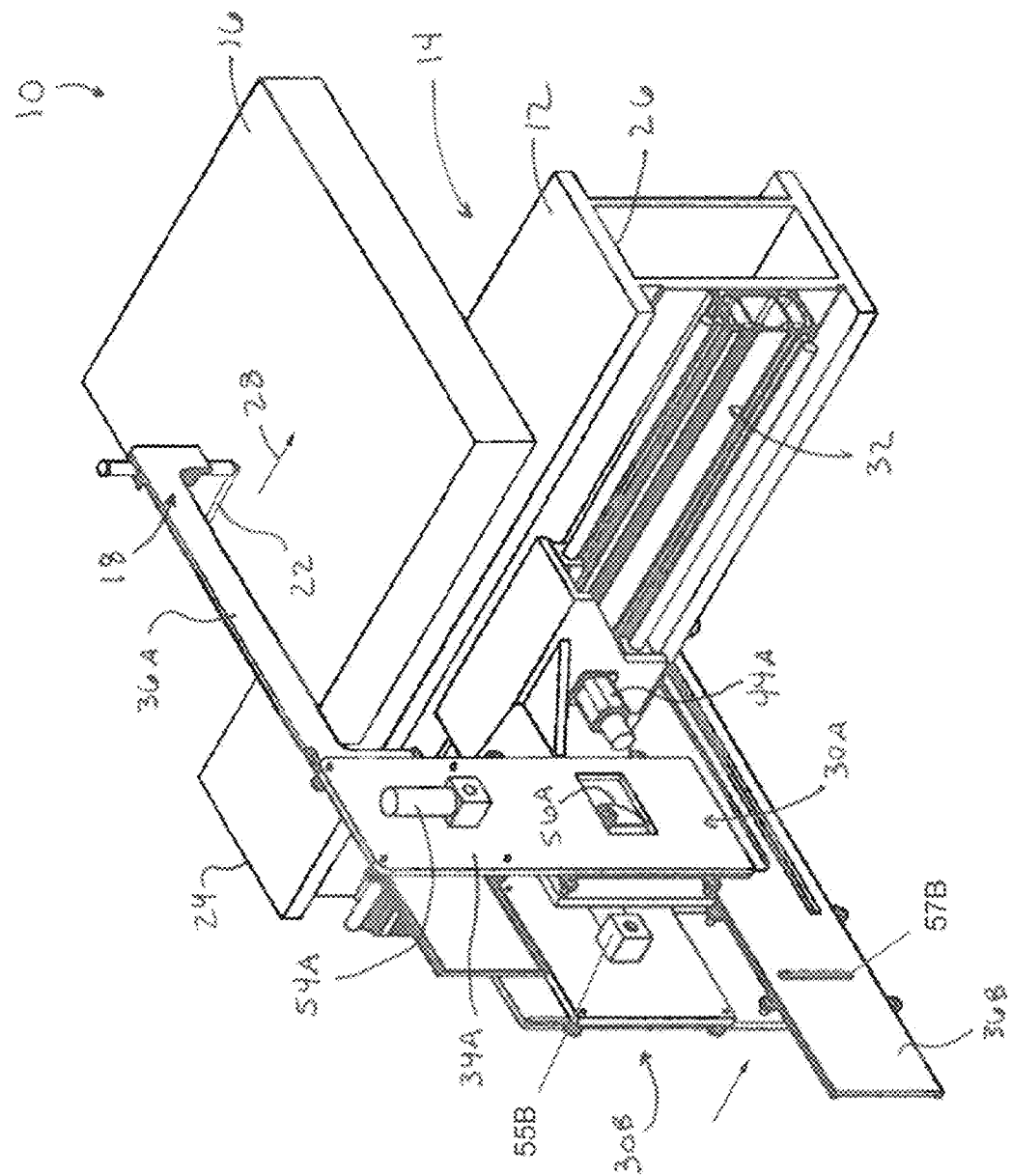
FIG. 1 is a perspective view of a first nonlimiting embodiment of a shaping system and depicts a slab of material positioned on a table of the system.
Figure 3:
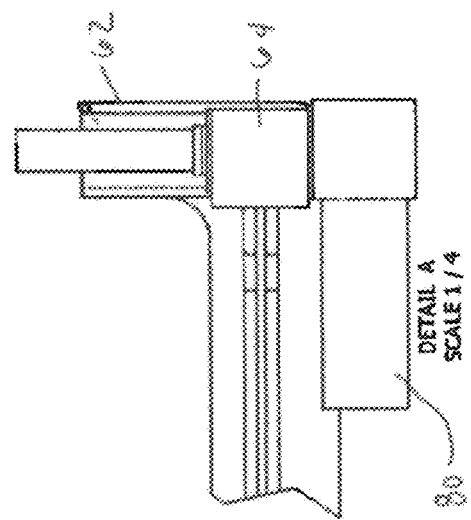
FIG. 3 is a detailed view of a portion of a gas delivery unit for a deburring device of the shaping system shown in FIGS. 1 and 2.

FIGS. 1 through 19 represent and depict various aspects of a nonlimiting embodiment of a first shaping system 10 within the scope of the invention. Although the invention will be described hereinafter in reference to particular features/functions schematically shown in the drawings, it should be noted that the teachings of the invention are not limited to these particular features/functions, and the invention does not require all of the features/functions or the interfunctionality represented in the drawings. Furthermore, it should be noted that the drawings are drawn for purposes of clarity when viewed in combination with the following description, and therefore are not necessarily to scale. To facilitate the following description of the embodiment represented in the drawings, relative terms, including but not limited to, "vertical," "horizontal," "lateral," "front," "rear," "side," "forward," "rearward," "upper," "lower," "above," "below," "right," "left," etc., may be used in reference to an orientation of the system during its operation, and therefore are relative terms but should not be otherwise interpreted as limiting the scope of the invention.

The contents of U.S. Pat. Nos. 7,806,029 and 8,402,868 are incorporated herein by reference. In view of similarities between the system shown in the drawings and the system of U.S. Pat. Nos. 7,806,029 and 8,402,868, the following discussion will focus primarily on certain aspects of the system, whereas other aspects not discussed in any detail may be, in terms of structure, function, materials, etc., similar to what was described for the system of U.S. Pat. Nos. 7,806,029 and 8,402,868.

The nonlimiting embodiment of the system 10 represented in FIGS. 1-14 includes a table 12, of which a portion is represented to show an opening 14, which may be a slot or other space within which one or more operations are performed on a slab 16 of material. The slab 16 may be formed of a wide variety of materials, of which steel is a nonlimiting example. In the embodiment represented in the drawings, two operations are being performed on the slab 16: a cutting or slitting operation (hereinafter, cutting operation) performed by what will be referred to as a cutting device 18, and a deburring operation performed by what will be referred to as a deburring device 20. The cutting and deburring devices 18 and 20 are represented as traveling above and below, respectively, the slab 16 so that the cutting operation is performed above the opening 14 and the deburring operation is performed from within the opening 14.

The cutting device 18 may comprise, for example, any suitable means capable of partially or entirely cutting through the slab 16. As nonlimiting examples, the cutting device 18 may comprise a cutting torch, water saw, laser cutting tool, etc. The deburring device 20 preferably comprises a means for forcibly removing burs from a slit 22 as the slit 22 is formed by the cutting device 18 or soon after the slit 22 is formed and the material that would otherwise form burs is still molten. Further details of a deburring device 20 will be described below in reference to FIGS. 15 through 19.

The cutting and deburring devices 18 and 20 are coupled to separate carriage units 30A and 30B, respectively. Each of the units 30A and 30B is adapted to travel at least part of the distance between opposite ends 24 and 26 of the table 12 along what will be referred to herein as the longitudinal axis of the table 12. This travel direction 28, indicated by an arrow in FIG. 1 (though equally applicable to travel in a direction opposite the arrow 28), may be accomplished by way of a track system 32 that couples the carriage units 30A and 30B to the table 12. Each carriage unit 30A and 30B generally includes a base 34A or 34B coupled to an arm 36A or 36B that carries its respective cutting device 18 or deburring device 20. Though capable of traveling in unison if so desired, because the cutting device 18 and deburring device 20 are coupled to separate carriage units, they are able to travel independently of each other in directions parallel the longitudinal axis of the table 12. As depicted in FIG. 1, the arms 36A and 36B of the carriage units 30A and 30B define a slab-receiving channel 38 therebetween within which the slab 16 is supported by the table 12. The cutting device 18 is coupled to the arm 36A and extends therefrom in a direction that is substantially orthogonal/perpendicular to the travel direction 28 to direct the cutting device 18 toward an upper face surface 40 of the slab 16 for cutting a slit 22 through the slab 16 from the upper face surface 40 of the slab 16 to a lower face surface 42 of the slab 16. Similarly, the deburring device 20 is coupled to its corresponding arm 36B and extends therefrom in a direction that is substantially orthogonal/perpendicular to the travel direction (arrow) 28 to direct the deburring device 20 toward the lower face surface 42 of the slab 16. As represented, the cutting device 18 and deburring device 20 can be directed in opposing directions.

Each carriage units 30A and 30B preferably comprises a motor 44A or 44B adapted to operate in conjunction with the track system 32, for example, via a pinion (not shown), to cause movement of the units 30A and 30B. The motors 44A and 44B enable each carriage unit 30A and 30B, and therefore their corresponding cutting or deburring device 18 or 20, to individually and independently move in the travel direction 28 across the slab 16. The motors 44A and 44B can be controlled by any suitable control means, for example, a PLC (not shown). The control means may be programmed so that when a slab 16 is placed on the table 12, the carriage units 30A and 30B move to respective cutting and deburring "home" positions. Upon detecting one of the sides ("gaging" side 46) of the slab 16 with a laser unit 48 (or other suitable detection means), the cutting device 18 and deburring device 20 can be moved with the motors to appropriate positions for initiating their respective cutting and deburring operations. Thereafter, as the slab 16 is being cut, the motors 44A and 44B cause the carriage units 30A and 30B to both travel parallel to the longitudinal axis of the table 12.

Figure 2:
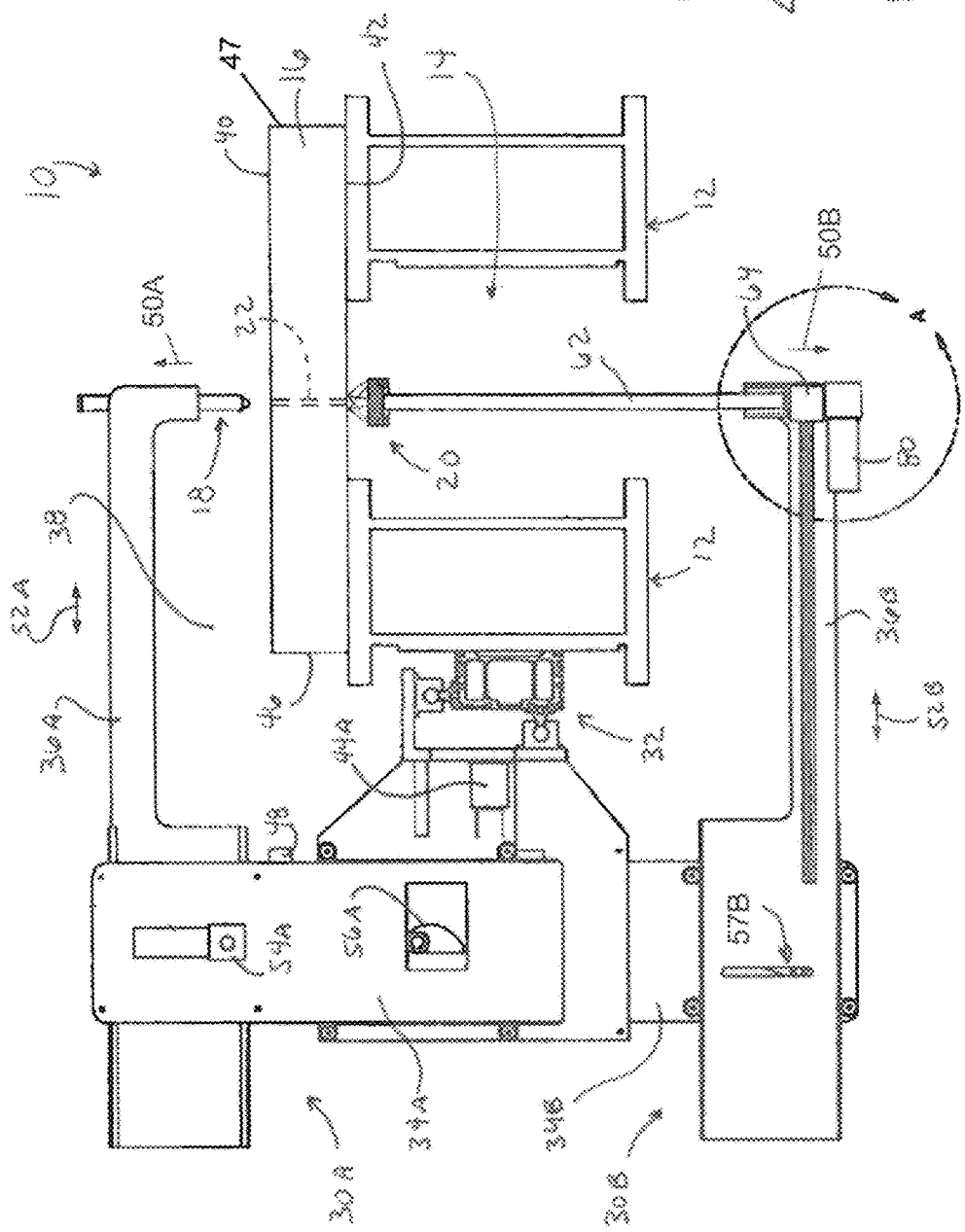
FIG. 2 is a side view of the shaping system shown in FIG. 1.

In addition to their travel direction 28 parallel to the longitudinal axis of the table 12, each carriage unit 30A and 30B is preferably adapted to enable their respective arms 36A and 36B to move in vertical directions toward and away from the slab 16, for example, as indicated by the arrows 50A and 50B oriented perpendicular to the travel direction 28 in FIG. 2. Each carriage unit 30A and 30B is also preferably adapted to enable their respective arms 36A and 36B to move in lateral directions transverse to the longitudinal axis of the table 12, for example, as indicated by the horizontal arrows 52A and 52B oriented perpendicular to the travel direction 28 in FIG. 2. In the embodiment represented in the drawings, vertical movement of the arms 36A and 36B can be achieved with a servomotors 55A and 55B and cam-slot mechanisms 56A and 56B, and lateral movement of the arms 36A and 36B can be achieved with servomotors 54A and 54B and cam-slot mechanisms 57A and 57B, though other means known in the art capable of causing movement in a member or structure are also within the scope of the invention. Similar to the motors 44A and 44B, the servomotors 54A, 54B, 55A, and 55B and cam-slot mechanisms 56A, 56B, 57A, and 57B can be controlled with any suitable control means, for example, a PLC. Controlled vertical movement and positioning (50A and 50B in FIG. 2) of the arms 36A and 36B can, among other things, ensure that the cutting device 18 and the deburring device 20 are each independently positioned relative the surfaces 40 and 42 of the slab 16 at all times during cutting and deburring. For instance, if either surface 40 or 42 of the slab 16 is bowed, the laser unit 48 can be utilized to detect the bow by locating the surfaces 40 and 42, and then provide feedback to cause automatic adjustment with the corresponding servomotor 55A, 55B, of the cutting device 18 and/or deburring device 20, as may be required to maintain desired distances between these devices 18 and 20 and their adjacent surfaces 40 and 42 of the slab 16.

The laser unit 48 can also be utilized to control lateral movement and positioning (52A and 52B) of the arms 36A and 36B. For example, feedback from the laser unit 48 can be used to position the cutting and/or deburring device 18 and 20 relative to the gaging side 46 of the slab 16, such that the lateral positions of the cutting and/or deburring device 18 and 20 can be at the widthwise center of the slab 16 or any position between the gaging side 46 and the opposite side 47 of the slab 16. As such, the cutting and/or deburring device 18 and 20 can be positioned to narrow the slab 16 or to remove a side portion of the slab 16, for example, to remove a taper that may be present on one or both sides 46 and 47 of the slab 16 as a transition between lengths of the slab 16 that have been intentionally cast to have different widths. Feedback from the laser unit 48 can also be used to ensure that the travel directions 28 of the cutting and/or deburring device 18 and 20 are parallel to the gaging side 46 of the slab 16 in the event that the slab 16 is not placed perfectly parallel to the longitudinal axis of the table 12.

According to a preferred aspect of the invention, the servomotor 44B that controls the horizontal movement of the deburring device 20 via the arm 36B is also adapted to induce an oscillation movement, for example, ±10 mm, so that the deburring device 20 can be moved toward and away from the breakthrough point at which the slit 22 is being generated in the slab 16 (i.e., the leading edge of the slit 22 where it exits the slab 16 at the lower surface 42) in order to more effectively remove burs trying to form at the breakthrough point. The oscillation movement is in the travel direction 28 and preferably at a linear velocity greater than the linear velocities of the cutting device 18 and deburring device 20 in the travel direction 28.

Although the shaping system 10 is illustrated as having a single cutting device 18 and a single deburring device 20, it will be appreciated that the system 10 may include more than one cutting device 18 and/or more than one deburring device 20. For example, additional cutting devices 18 and/or deburring devices 20 may be independently mounted to the carriage units 30A and 30B or to additional carriage units similar to the units 30A and 30B depicted in the drawings.

The shaping system 10 of the present invention may further optionally include various features that may be present or desired in industrial equipment, including safety-related features associated with the cutting device 18 and deburring device 20.

Figure 14:
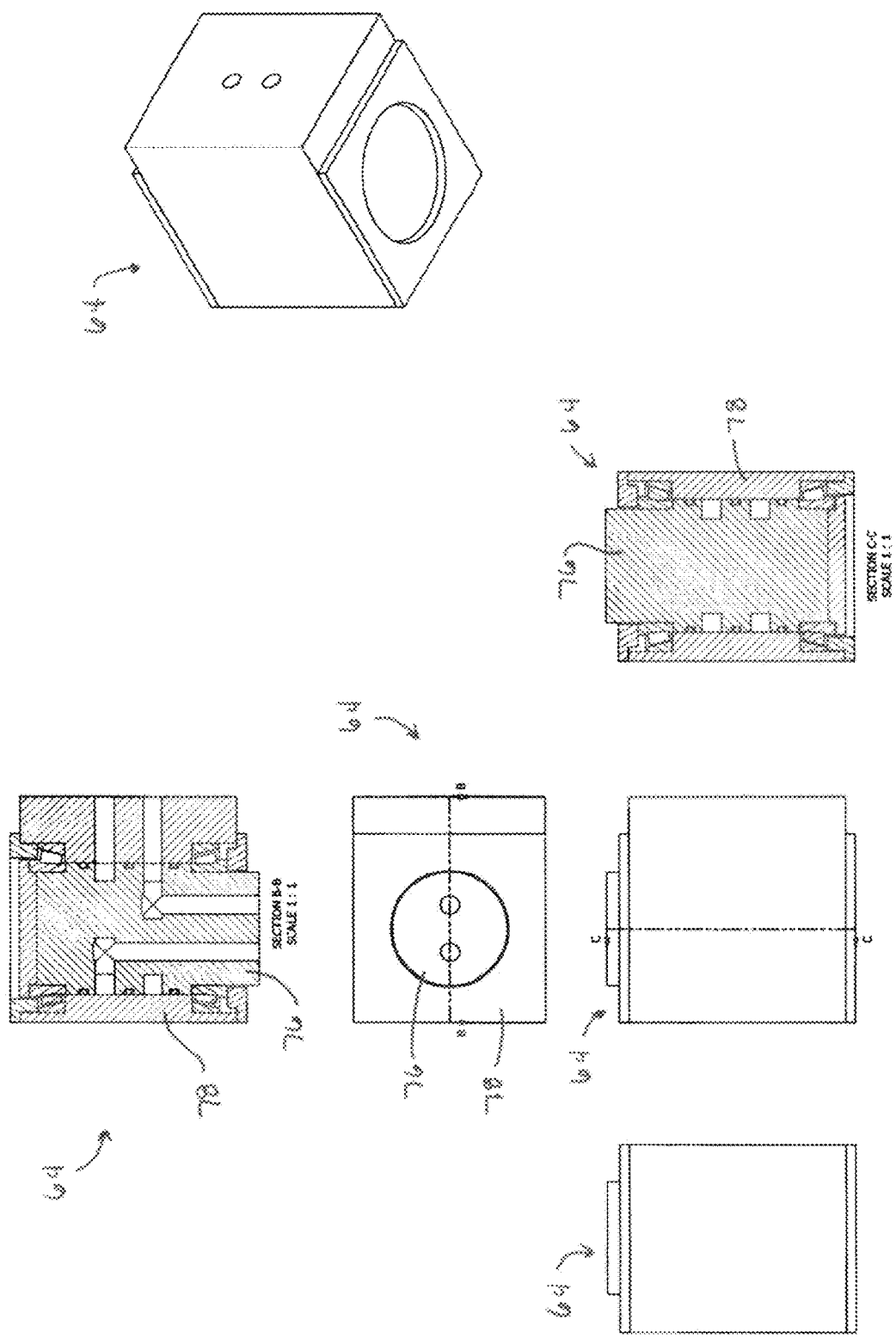
FIG. 14 contains various views of a distribution valve of the gas delivery unit shown in FIG. 3.
Figure 15:
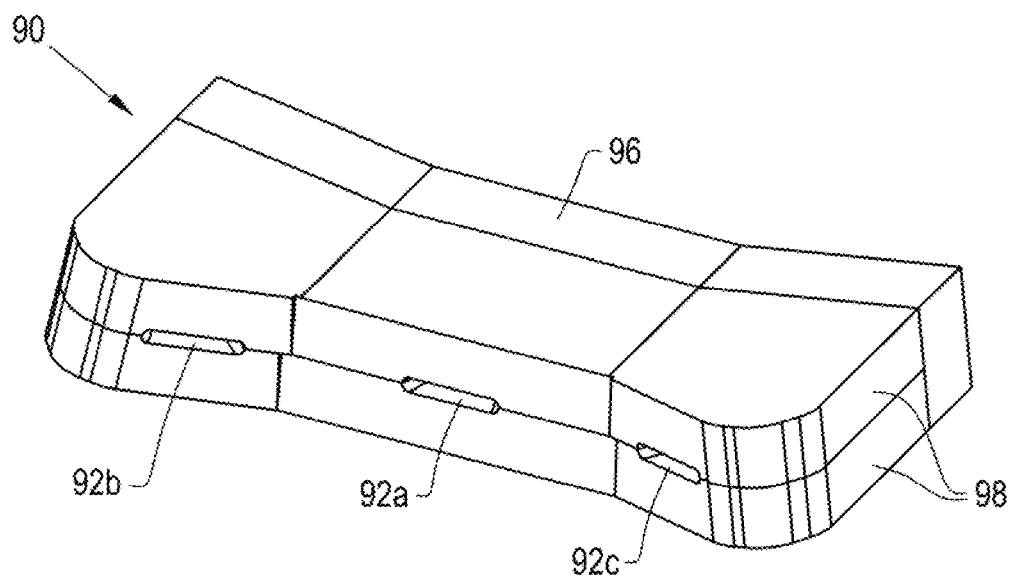
FIGS. 15 and 16 are perspective and front views of a second nonlimiting deburring device of the shaping system shown in FIGS. 1 through 13.
Figure 16:
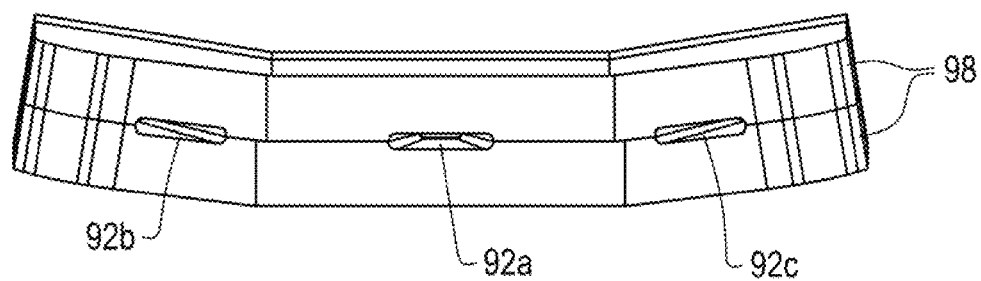
Figure 17:
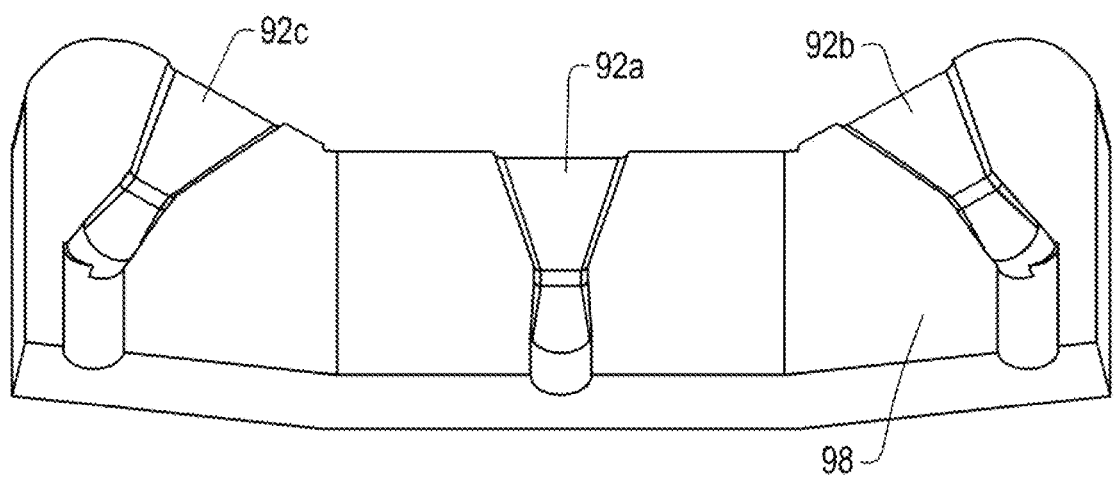
FIG. 17 contains a top, perspective view of a subcomponent of the deburring device shown in FIGS. 15 and 16.
Figure 18:
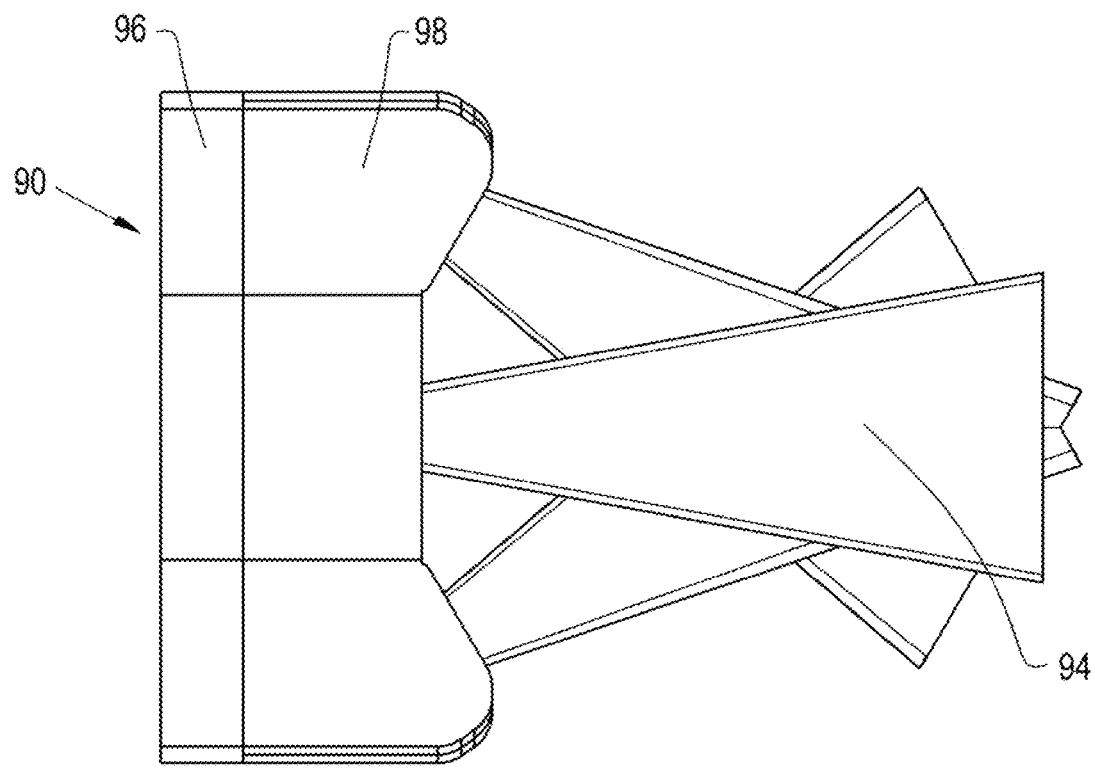
FIGS. 18 and 19 contains top and side views of flow paths of gases from the deburring device shown in FIGS. 15 and 16.
Figure 19:
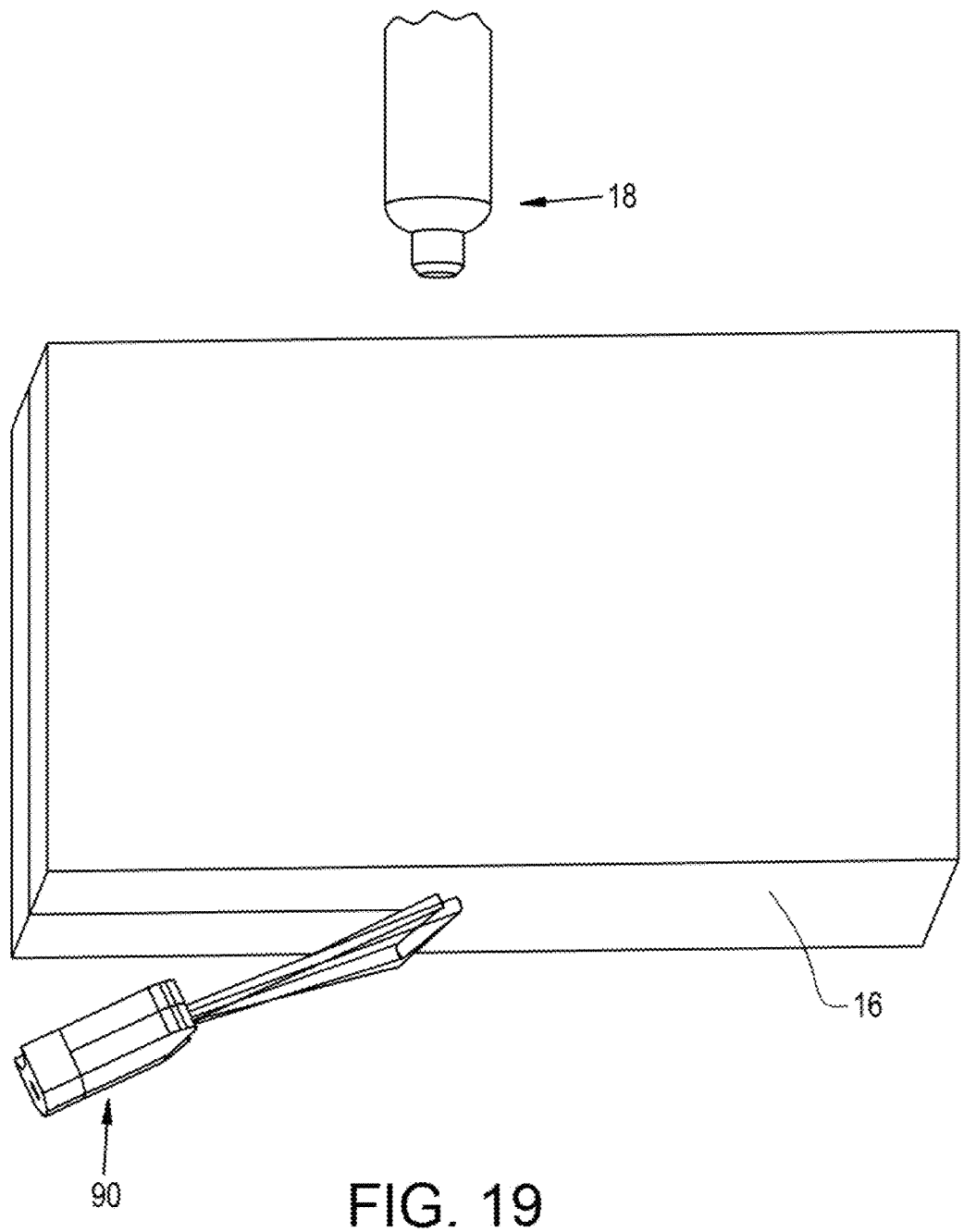

As previously noted, a particular but nonlimiting embodiment of a deburring device 20 is represented in some detail in FIGS. 15 through 19. If using a torch as the cutting device 18, a preferred means of deburring the slit 22 is to direct a gas stream of pure oxygen or containing oxygen at the lower edge of the slit 22, i.e., the interface between the slit 22 and the lower surface 42 of the slab 16. FIGS. 15, 18, and 19 depict such a device 20 as comprising a manifold 90 that is connected via a conduit 62 to a valve 64, the latter of which is depicted in FIG. 14. As shown in FIGS. 15 through 19, the manifold 90 is in the form of a block assembly comprising a base block 96 and a pair of nozzle blocks 98. The base block 96 comprises three passages (not shown) for supplying one or more supply gases to three nozzles 92a, 92b, and 92c defined as a result of assembling the pair of nozzle blocks 98. As evident from FIGS. 15 through 17, the nozzle 92a is centrally located within the assembled nozzle blocks 98 and will be referred to as the central nozzle 92a, and the two remaining nozzles 92b and 92c are laterally offset from the central nozzle 92a and will be referred to as the lateral nozzles 92b and 92c. The manifold 90 comprises a non-planar cross-sectional shape best shown in FIG. 16. The shape is configured to align the axes of the central and lateral nozzles 92a-c such that they converge generally towards a focal zone or point 94, but on different planes. For example, FIGS. 18 and 19 schematically represent gas flow paths from the central and lateral nozzles 92a-c, with the lateral nozzle 92c having a flow path directed on a first plane, the central nozzle 92a having a flow path directed on a second plane above the first plane, and the lateral nozzle 92b having a flow path directed on a third plane below the first plane. Because the outlets of the nozzles 92a-c are rectangular in shape, as a nonlimiting example, slits having a width to height aspect ratio of 1:10, the gas streams that exit the nozzles 92a-c are capable of impinging an area significantly larger than the focal zone or point 94 of the converging axes of the nozzles 92a-c.

Figure 4:
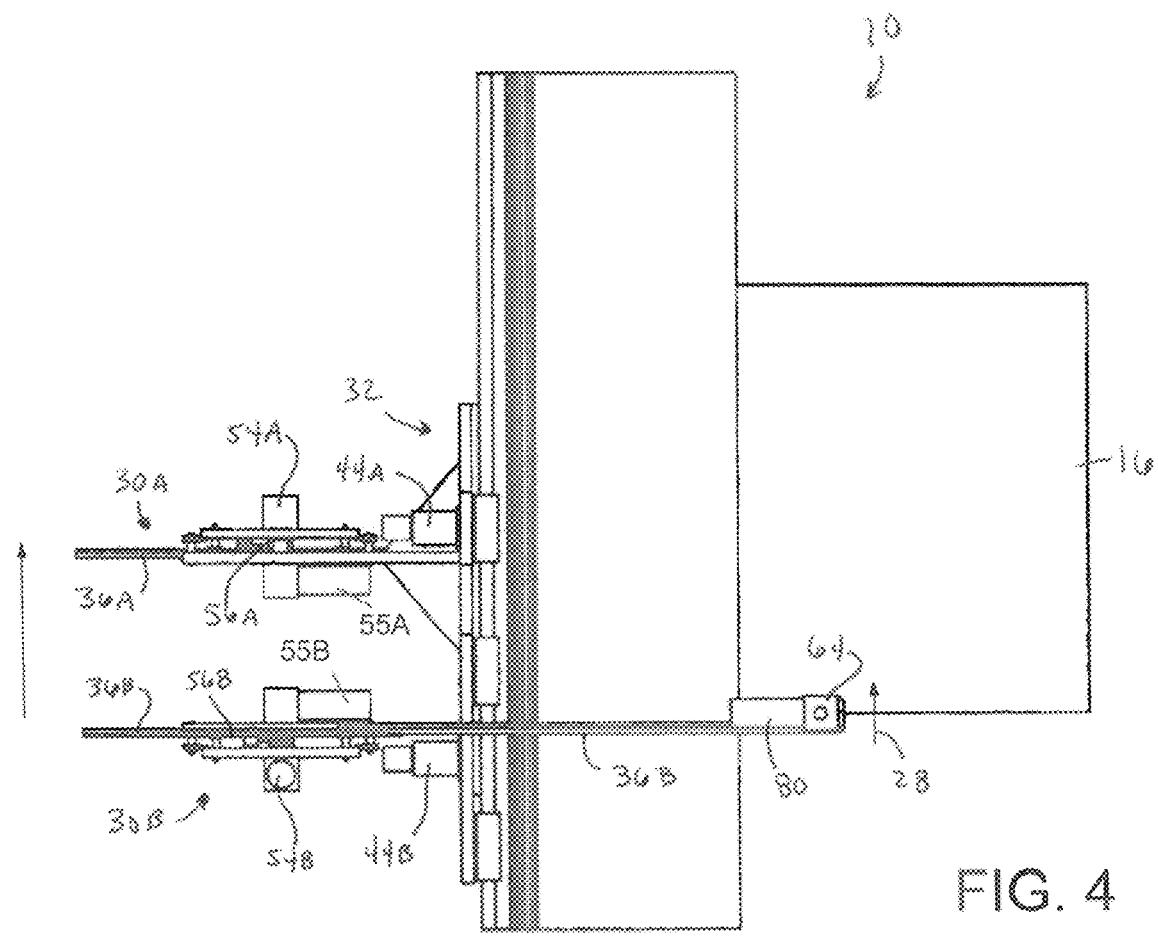
FIGS. 4 and 5 are bottom and rear views, respectively, of the shaping system shown in FIGS. 1 and 2.
Figure 5:
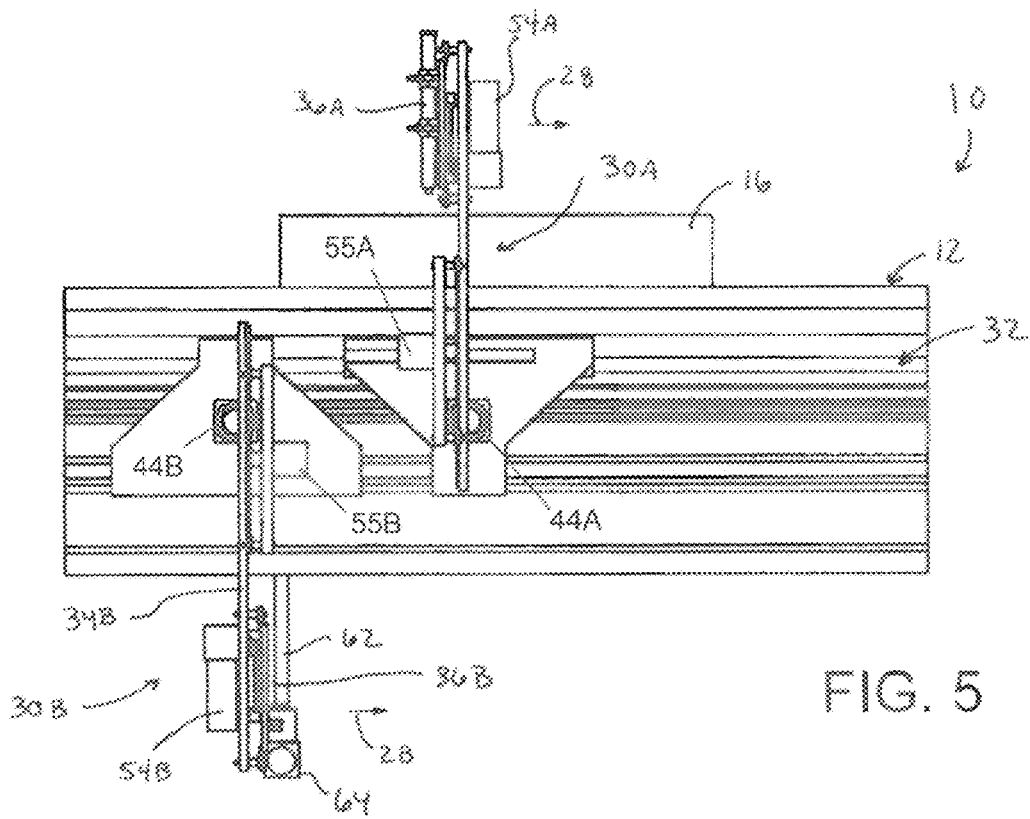
Figure 6:
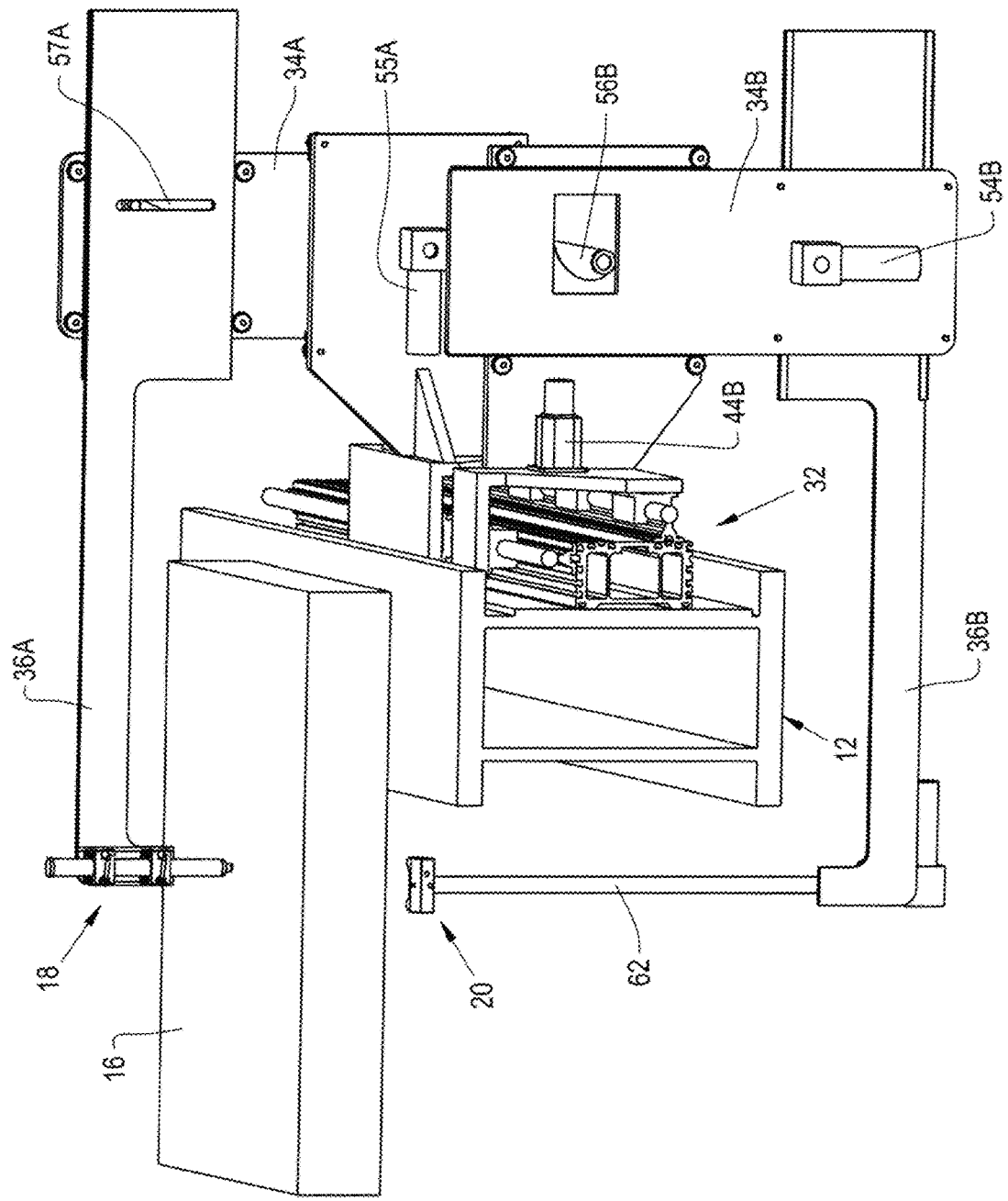
FIGS. 6 through 13 are additional views of the shaping system shown in FIGS. 1 through 5.
Figure 7:
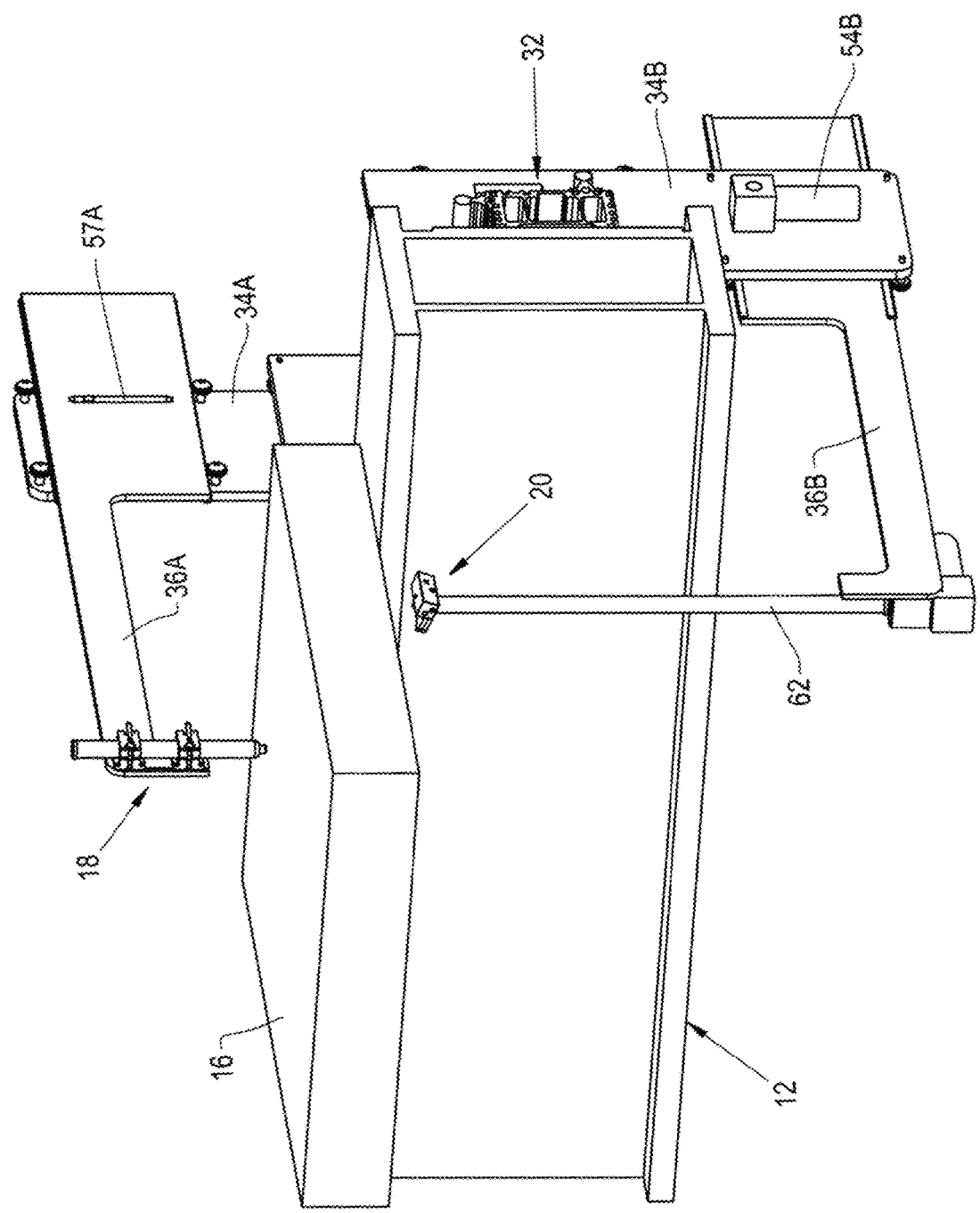
Figure 8:
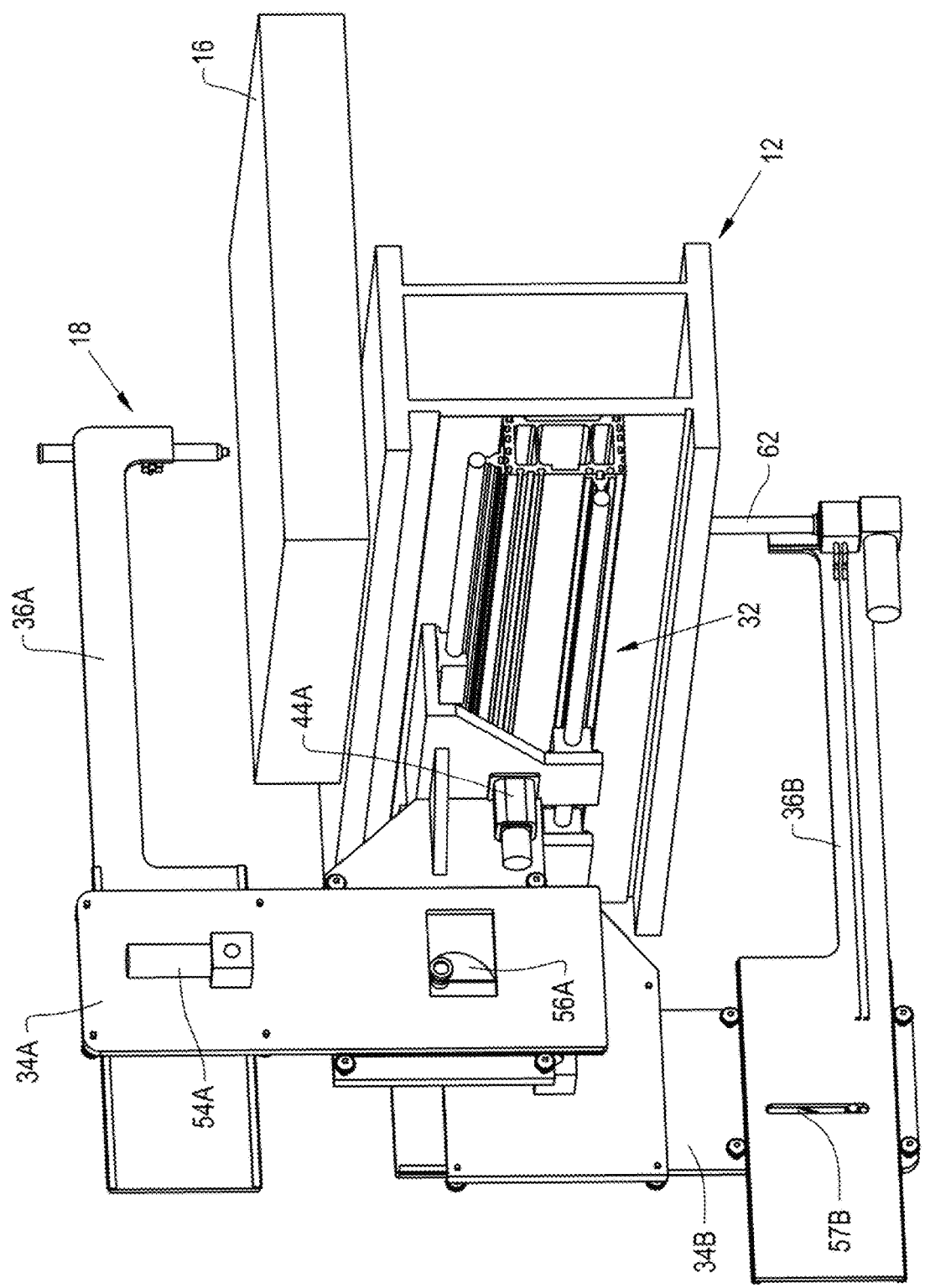
Figure 9:
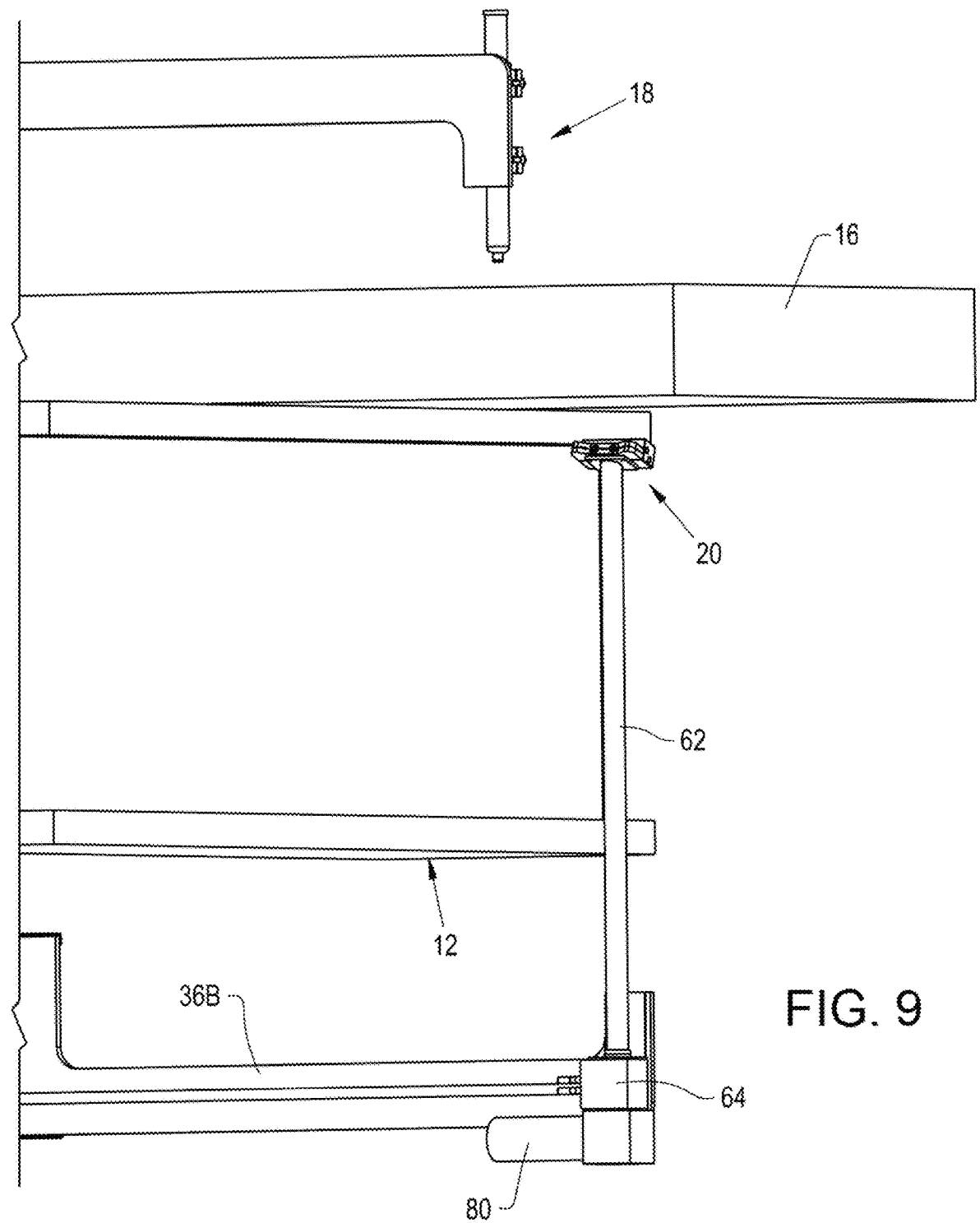
Figure 10:
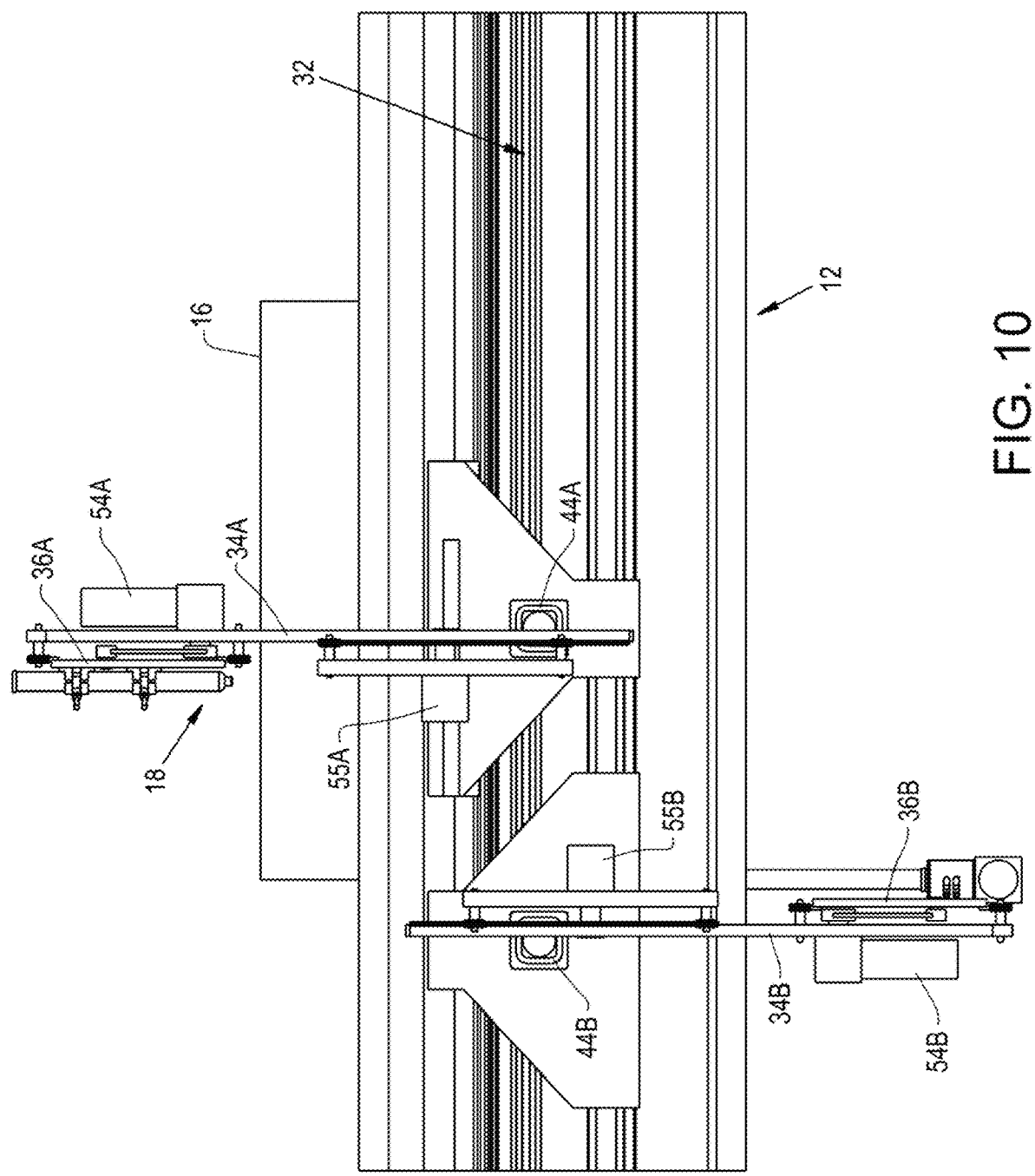
Figure 11:
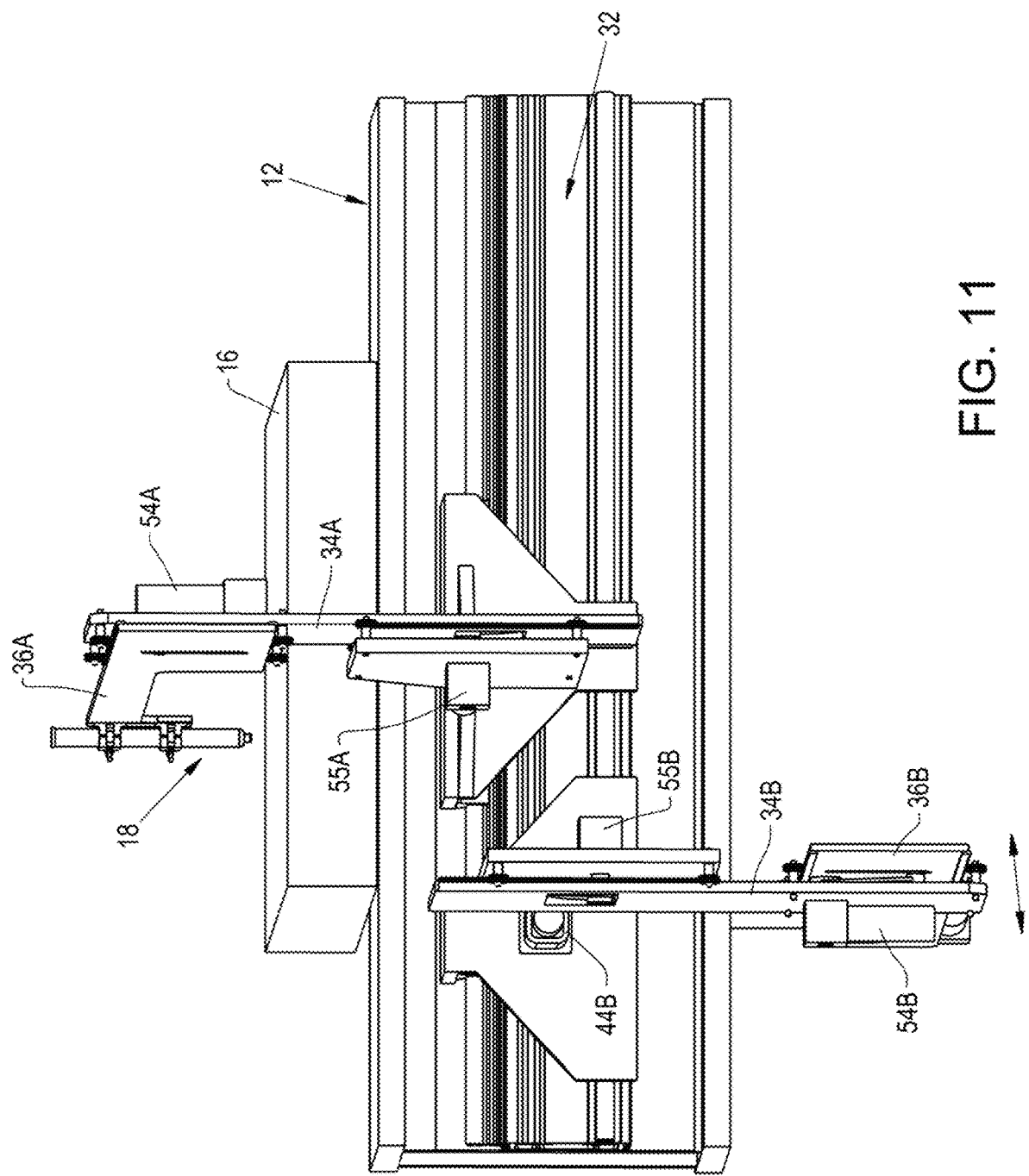
Figure 12:
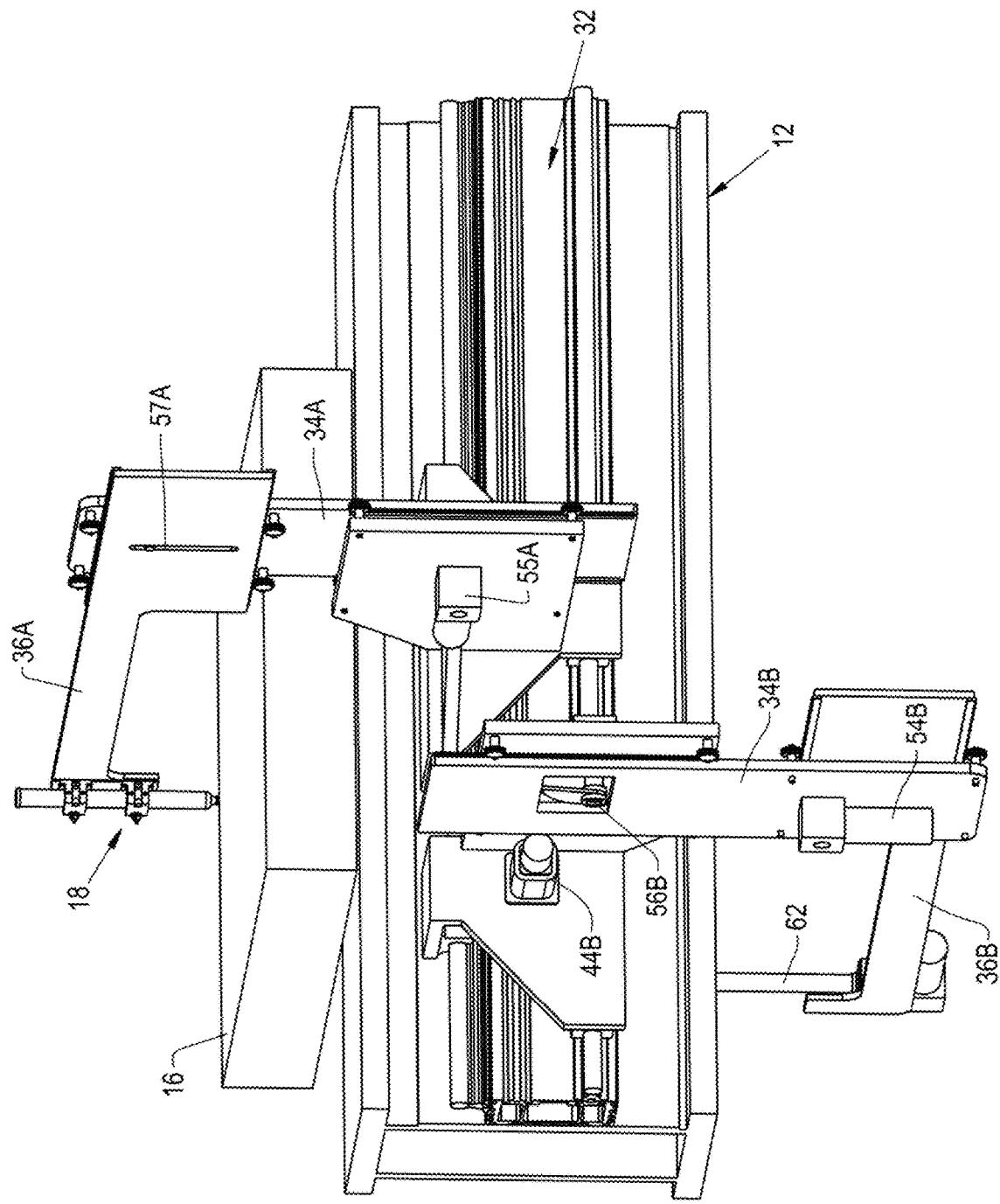

FIGS. 4 and 5 show the placement of the arms 36A and 36B along the track system 32 as positioning the deburring device 20 behind the cutting device 18 relative to the travel direction 28. Consistent therewith, FIG. 7 represents the deburring device 20 and its manifold as being located behind the cutting device 18 relative to the travel direction 28, and as also discharging the gas streams exiting the nozzles 92a-c generally in the travel direction 28 and therefore toward the location in the slab 16 at which the cutting operation is being performed on the slab 16, and particularly toward the breakthrough point at the leading edge of the slit 22 at the lower surface 42 of the slab 16. According to a preferred but optional aspect of the invention, the manifold 90 is oriented so that the converging axes of the nozzles 92a-c are not parallel or perpendicular to the lower surface 42 of the slab 16, but instead are disposed at an acute angle to the lower surface 42, as a nonlimiting example, about twenty degrees as represented in FIGS. 7, 9, 13, and 19. Such an orientation of the gas streams has been shown to promote deburring of a slit produced by a torch.

According to another preferred but optional aspect of the invention, the gas supplied to the central nozzle 92a is at a lower pressure than the gas supplied to the lateral nozzles 92b and 92c. As a nonlimiting example, the central nozzle 92a may be supplied a gas at a pressure of about 2.5 to 3 bar, whereas the lateral nozzles 92b and 92c may be supplied a gas at a pressure of about 3.5 or higher. Such a distribution of the gases at different pressures has been shown to promote deburring of a slit produced by a torch. To deliver two separate gases to the manifold 90, the conduit 62 contains at least two passages that are supplied with the gases by the valve 64.

Figure 13:
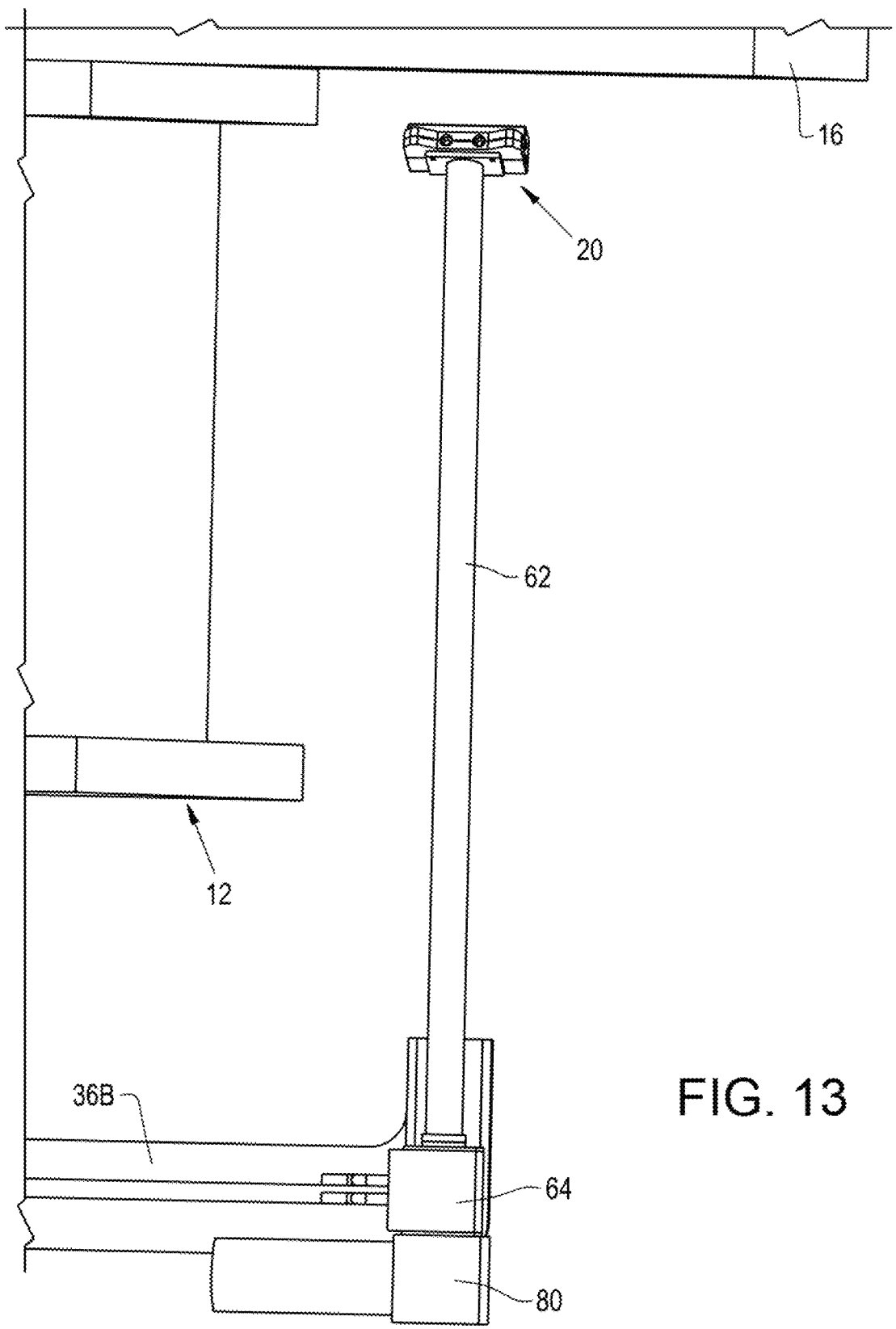

To further promote the deburring operation and the versatility of the manifold 90, the manifold 90 is preferably capable of being rotated about the axis of the conduit 62 so that the gas streams exiting the nozzles 92a-c can be selectively directed at the slit 22 or at the surface 42 of the slab 16 to either side of the slit 22. For this reason, FIG. 14 depicts the valve 64 as being able to continuously supply two different gases to the conduit 62 via passages within an internal valve body 76 that can be rotated within an outer housing 78 of the valve 64. FIG. 13 depicts a motor 80 coupled to the valve 64 for this purpose. This feature can also be employed in the event that a cut transverse to the longitudinal axis of the table 12 is desired, for example, in the lateral direction 52A of the cutting device 18. In such an event, the carriage 30B can position the deburring device 20 laterally behind the cutting device 18, the motor 80 operated to rotate the deburring device 20 and direct its gas streams in the lateral direction 52B toward the cutting device 18, and the cam-slot mechanism 57B operated to cause the deburring device 20 to follow the cutting device 18 in the lateral direction 52B. For this capability, the arm 36B carrying the deburring device 20 may be modified in order enable the deburring device 20 to be laterally aligned with the cutting device 18.

Figure 20:
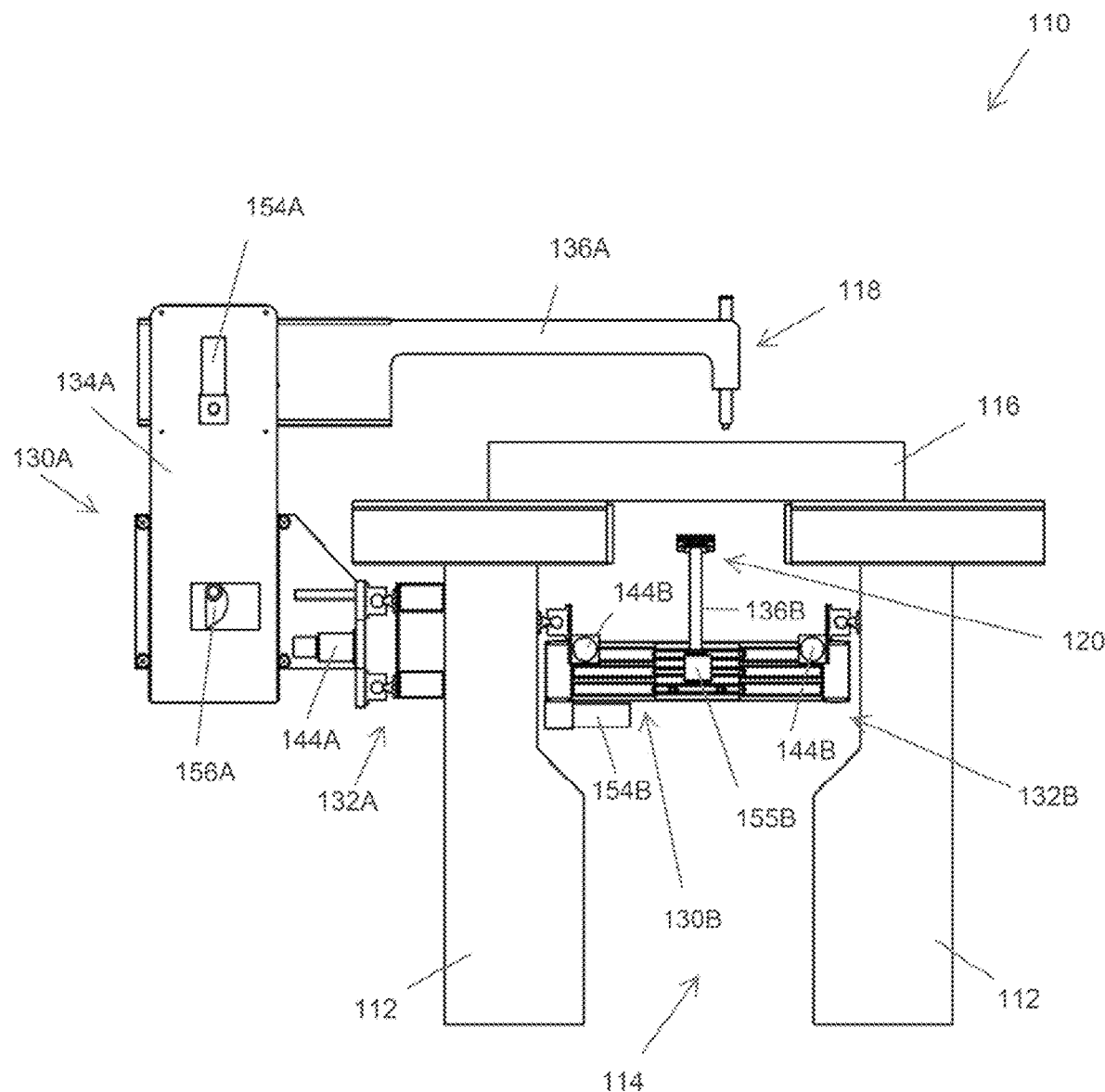
FIG. 20 is a side view of a second nonlimiting embodiment of a shaping system and depicts a slab of material positioned on a table of the system.
Figure 21:
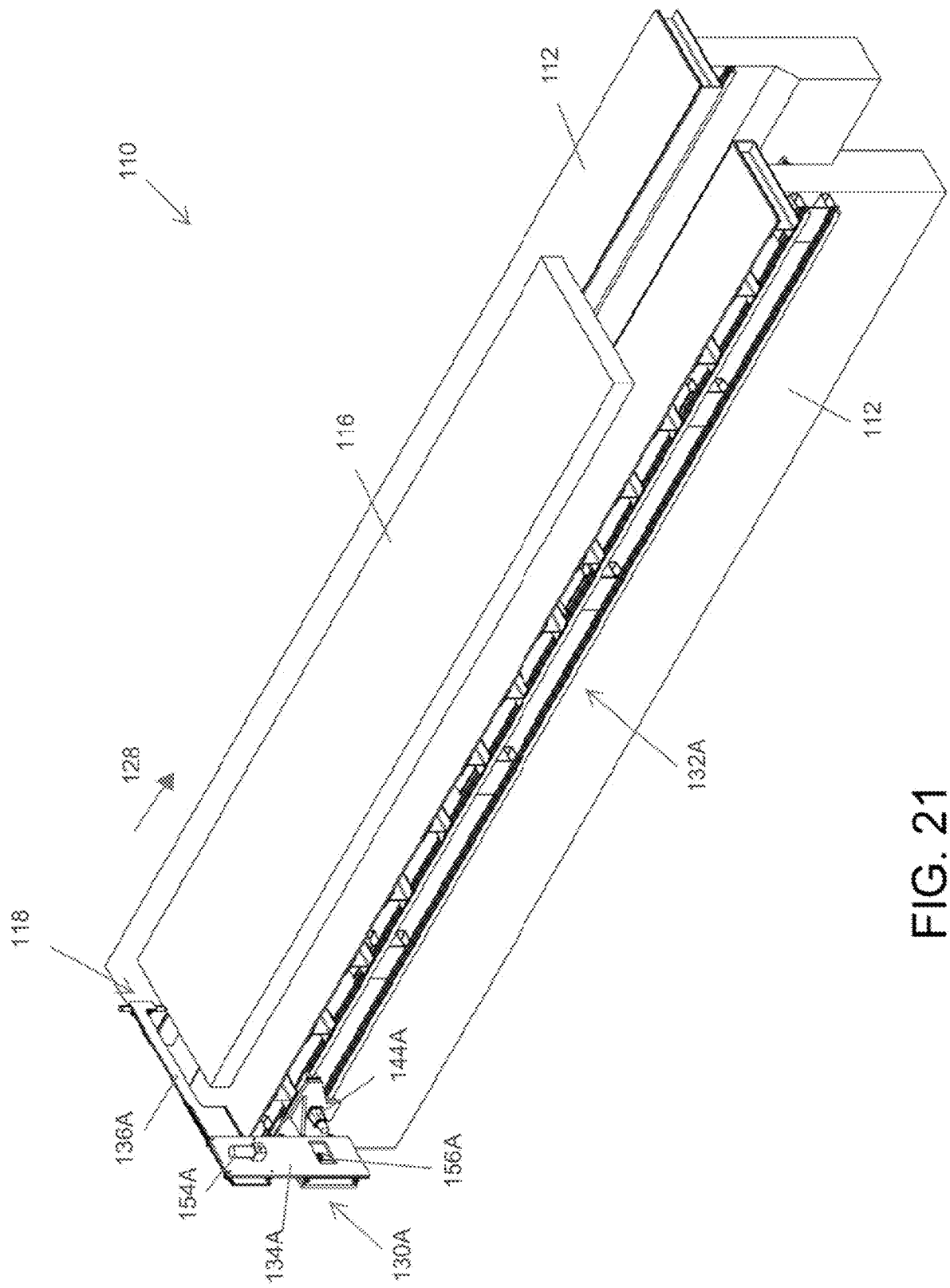
FIGS. 21 and 22 are perspective views of the shaping system shown in FIG. 20.
Figure 22:
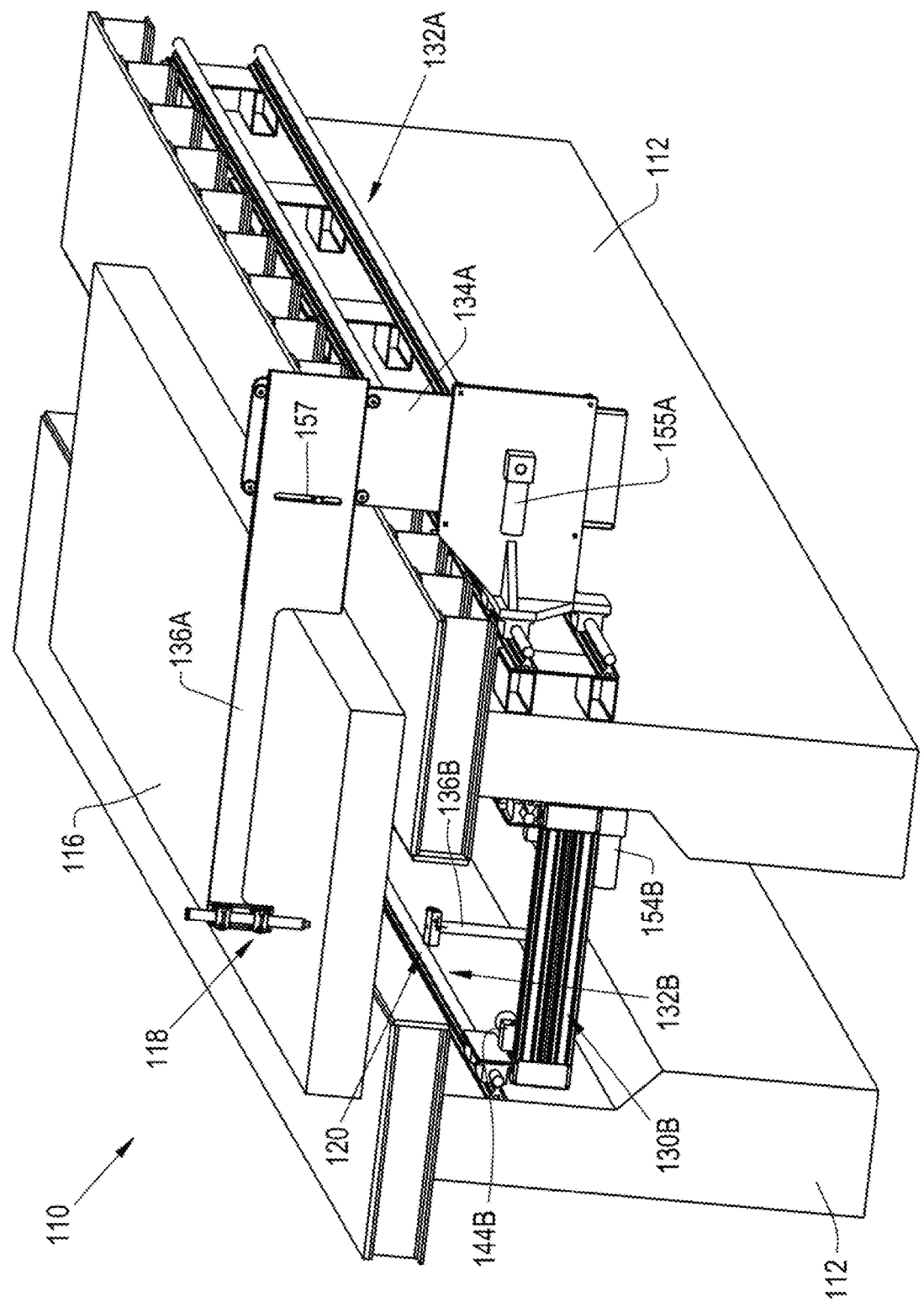
Figure 23:
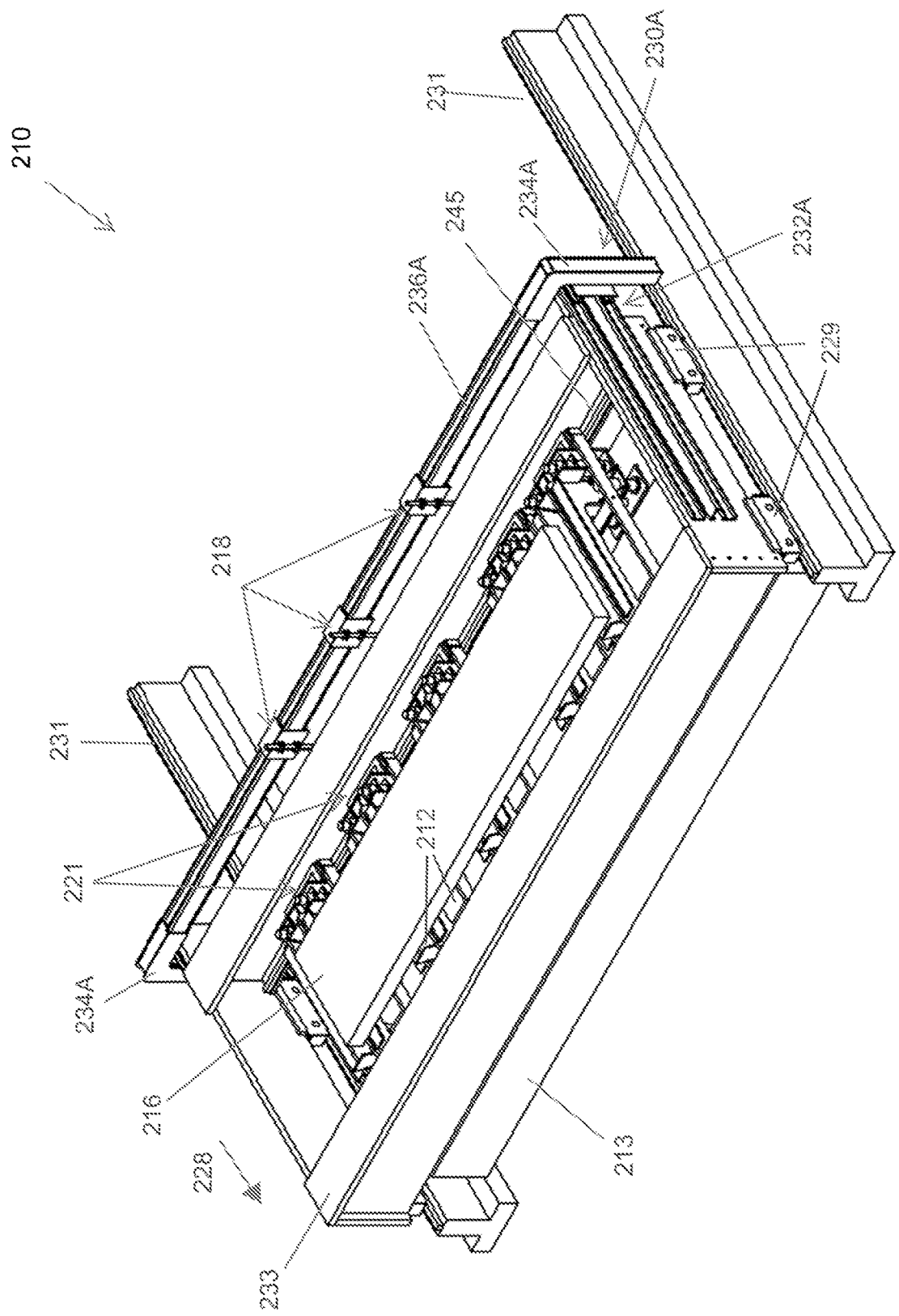
FIG. 23 is a perspective view of a third nonlimiting embodiment of a shaping system and depicts a plate positioned on tables of the system.
Figure 24:
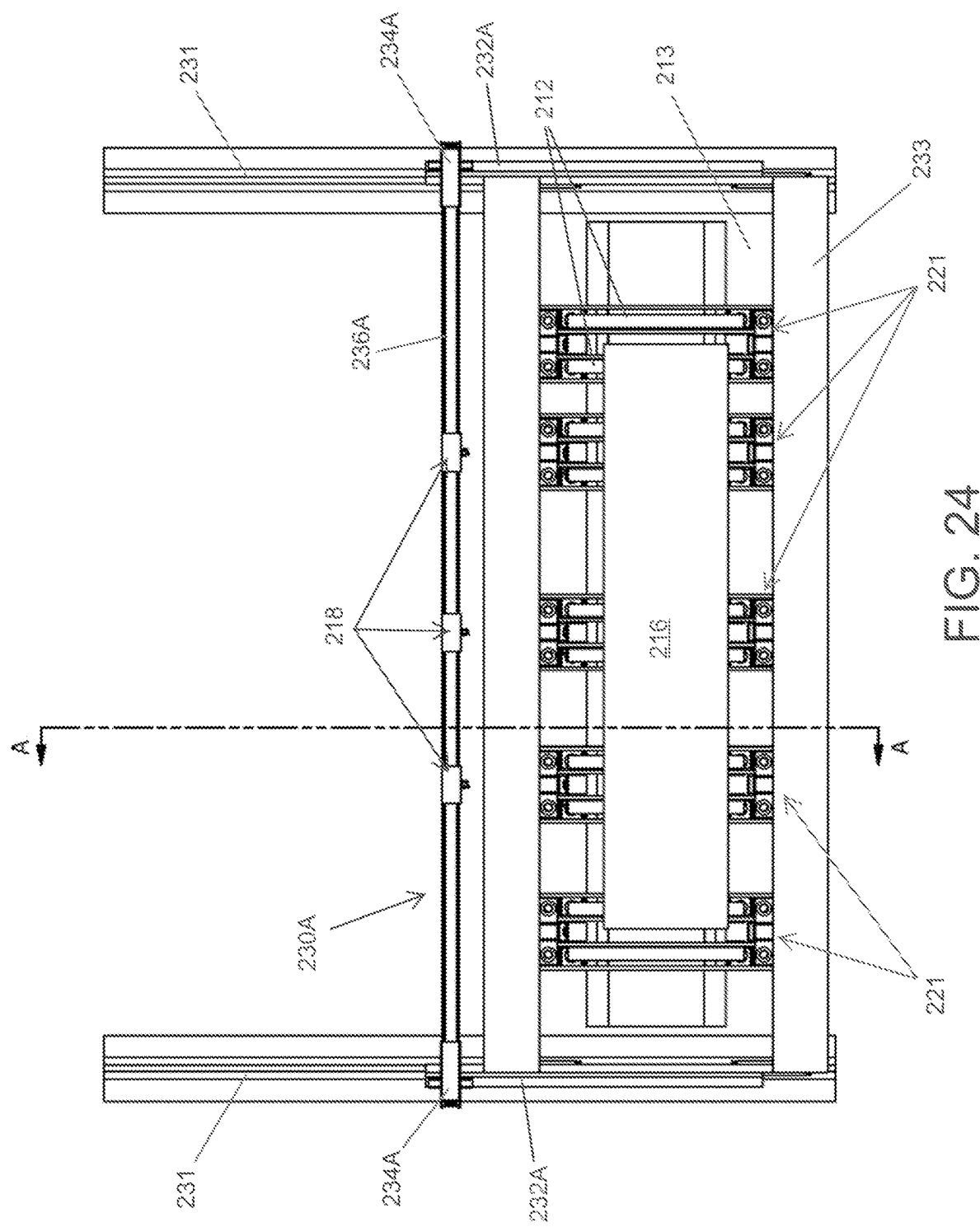
FIGS. 24, 25, and 26 are top, side, and front views of the shaping system shown in FIG. 23.
Figure 25:
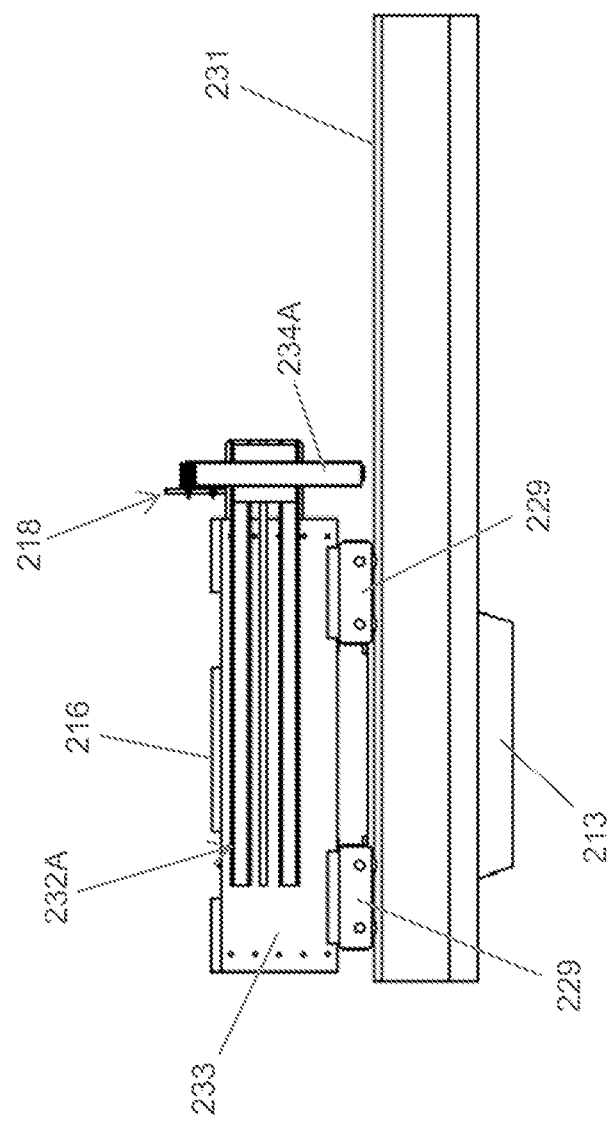
Figure 26:
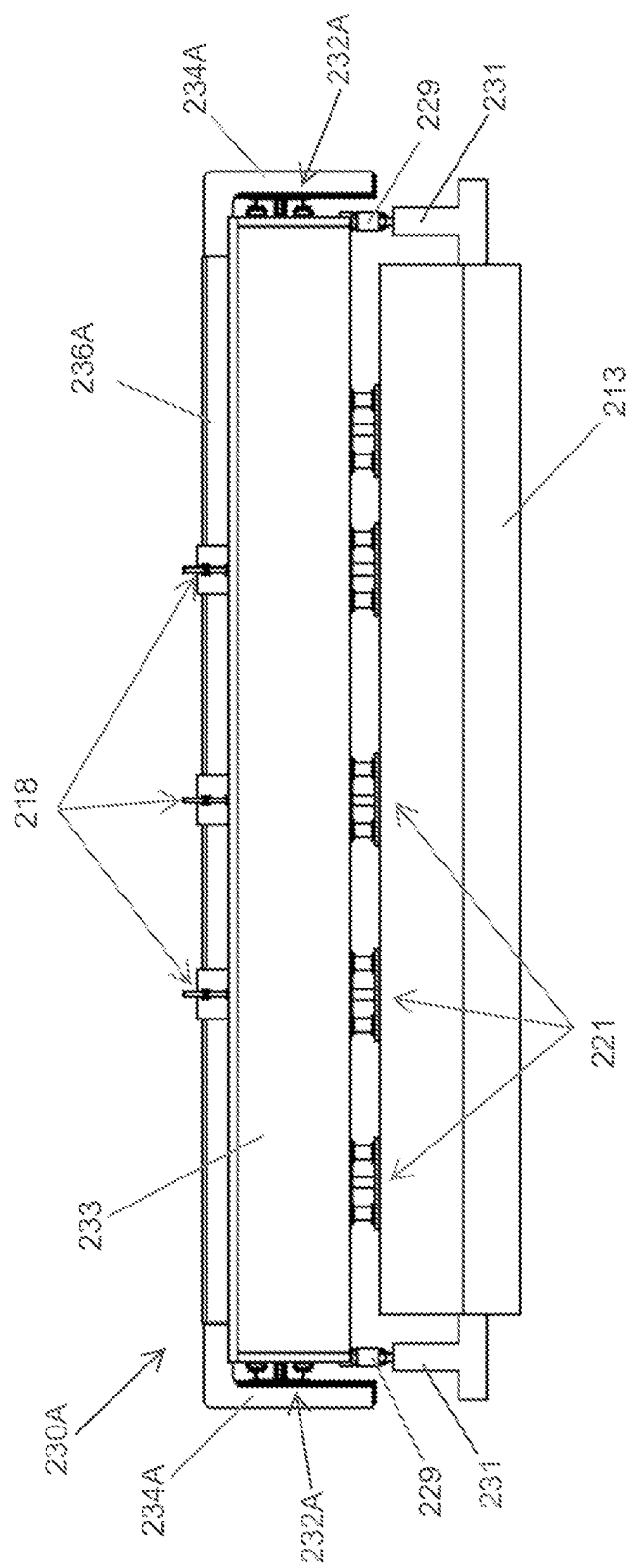
Figure 27:
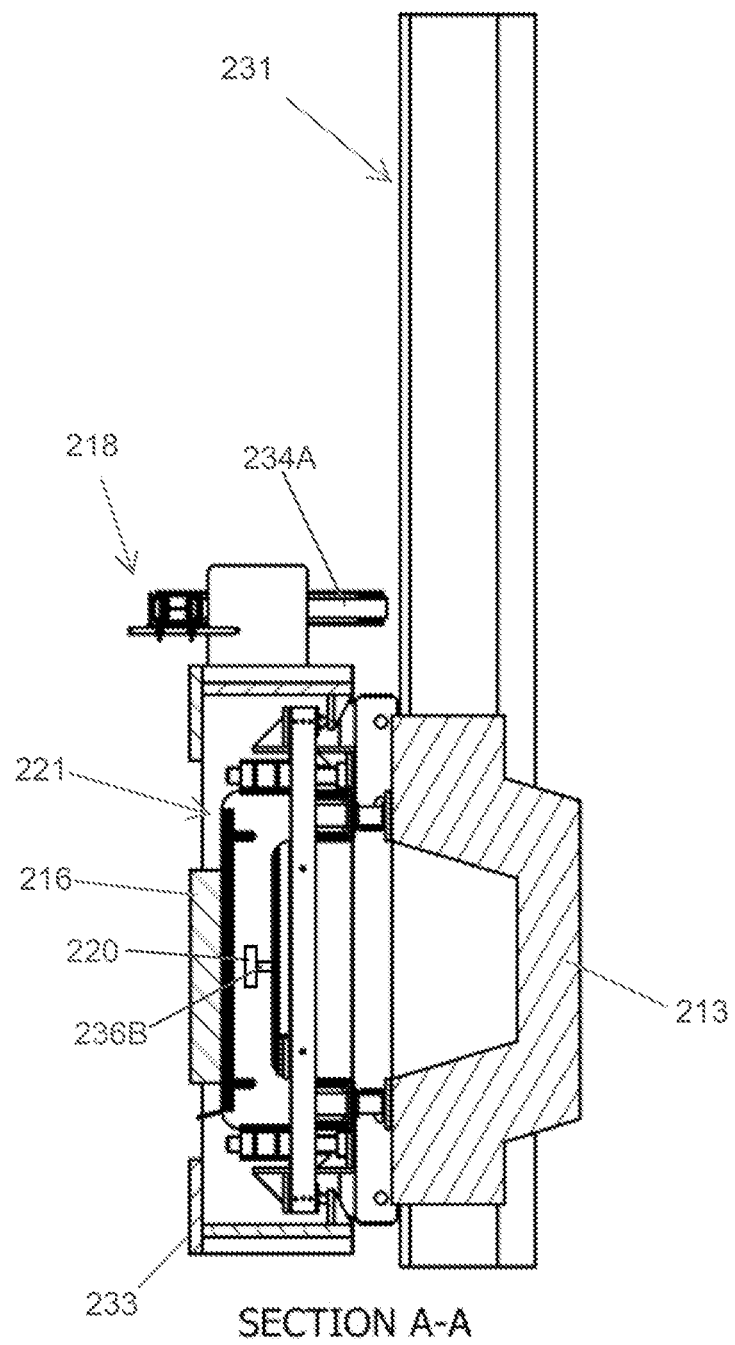
FIG. 27 is a cross-sectional view of the shaping system shown in FIG. 23 taken along section line A-A of FIG. 24.
Figure 28:
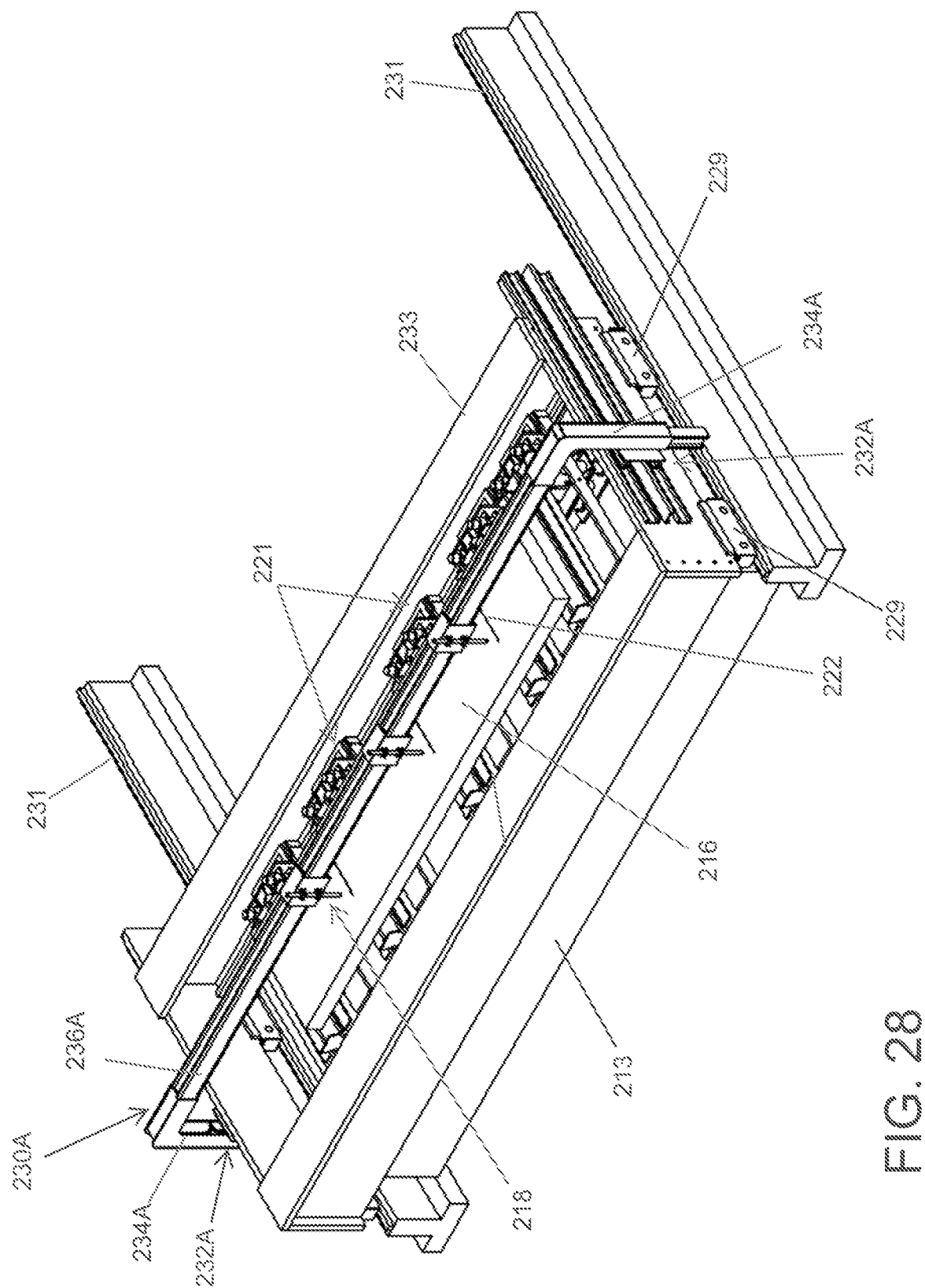
FIG. 28 is a perspective view of the shaping system of FIG. 23 during operation.
Figure 29:
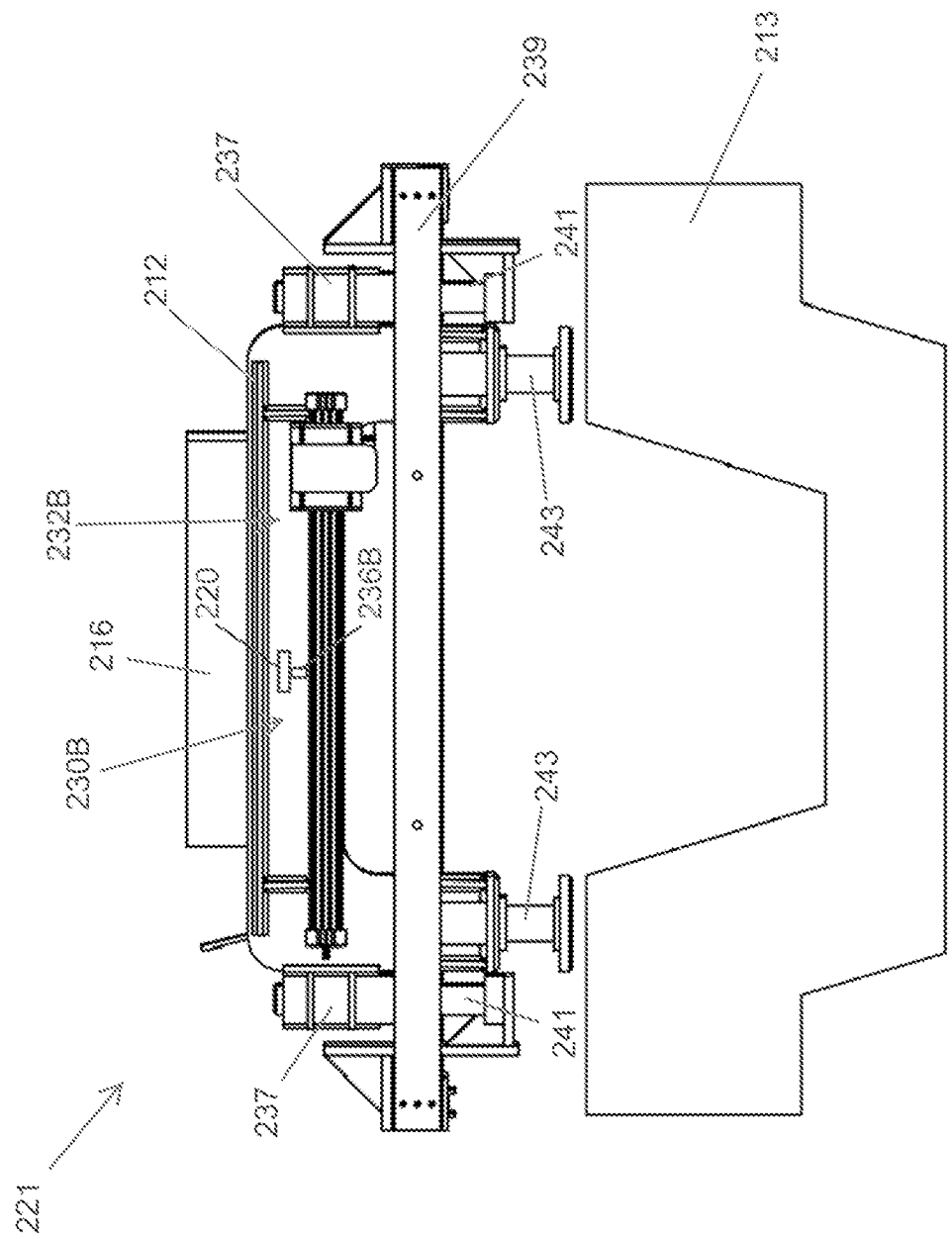
FIGS. 29 through 32 are additional views of the shaping system shown in FIGS. 23 through 27.
Figure 30:
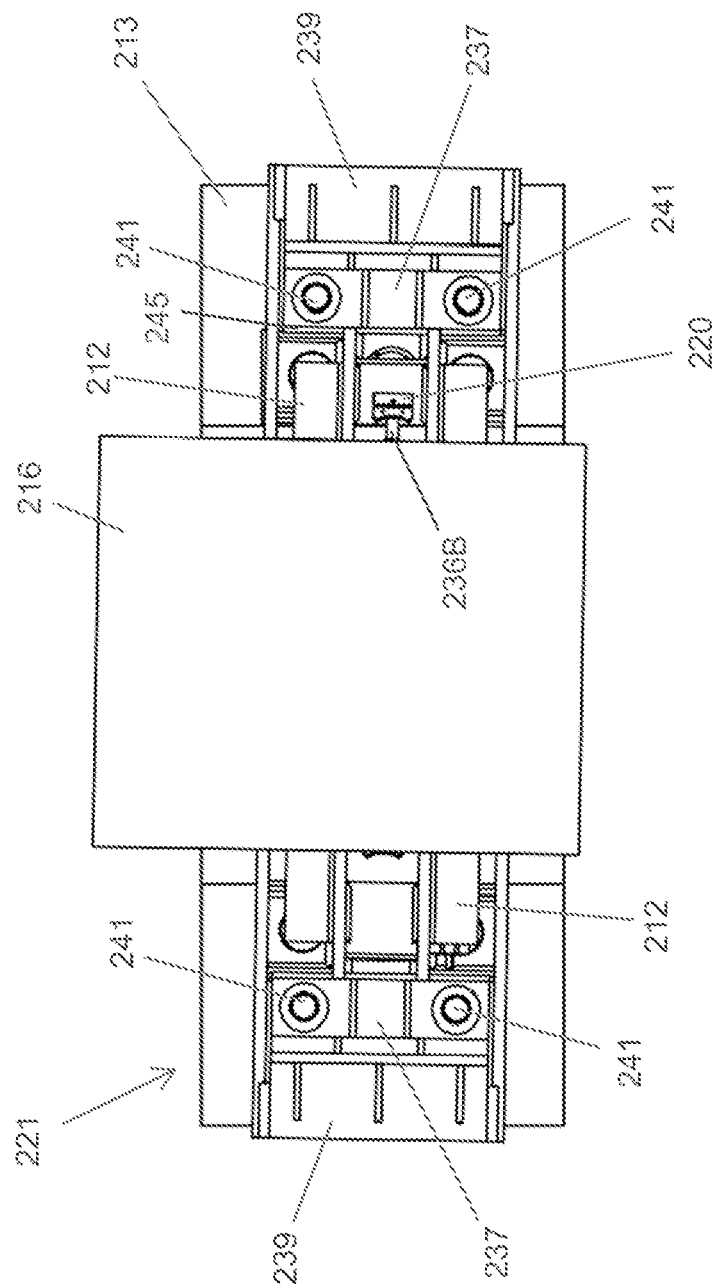
Figure 31:
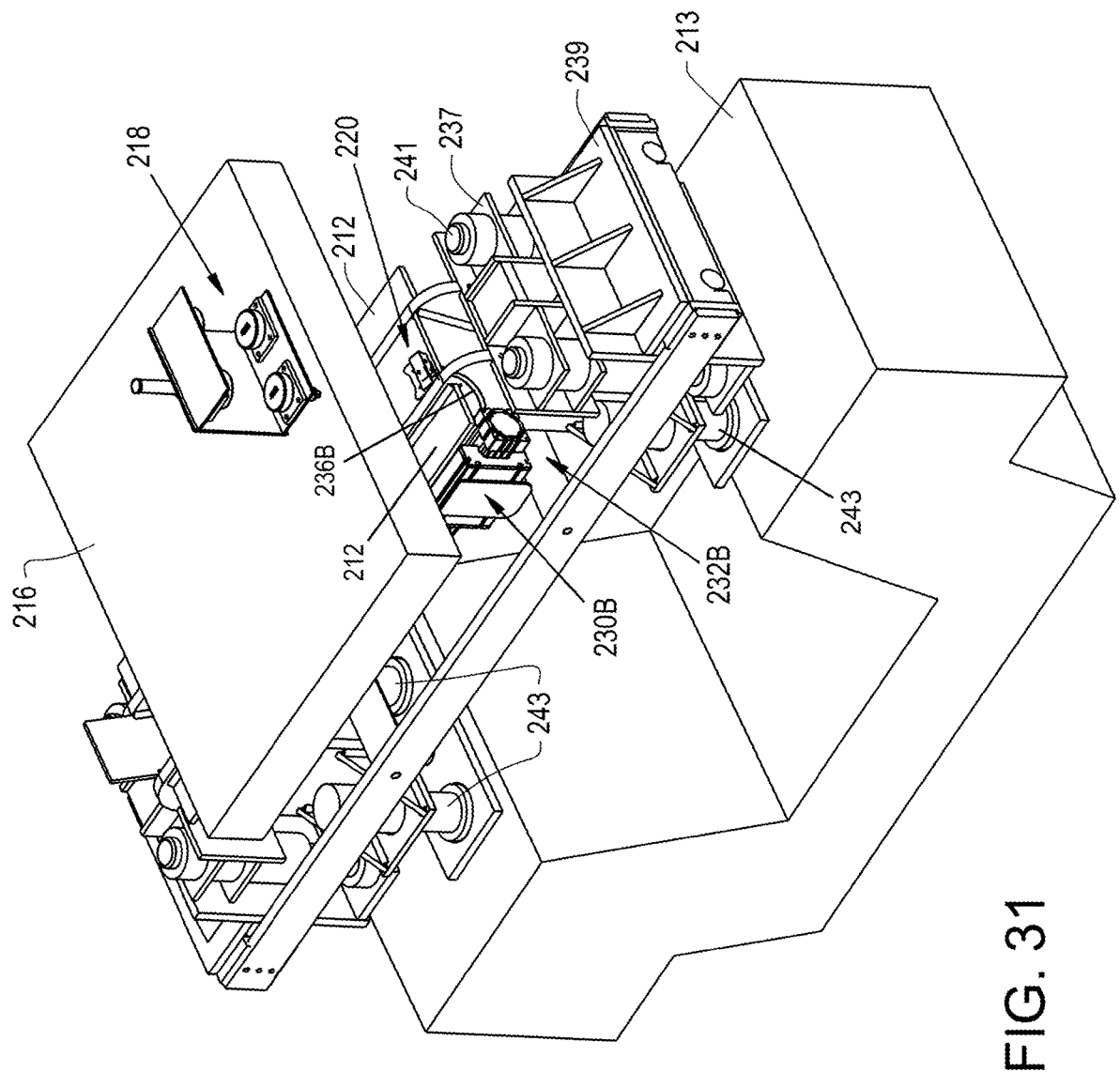
Figure 32:
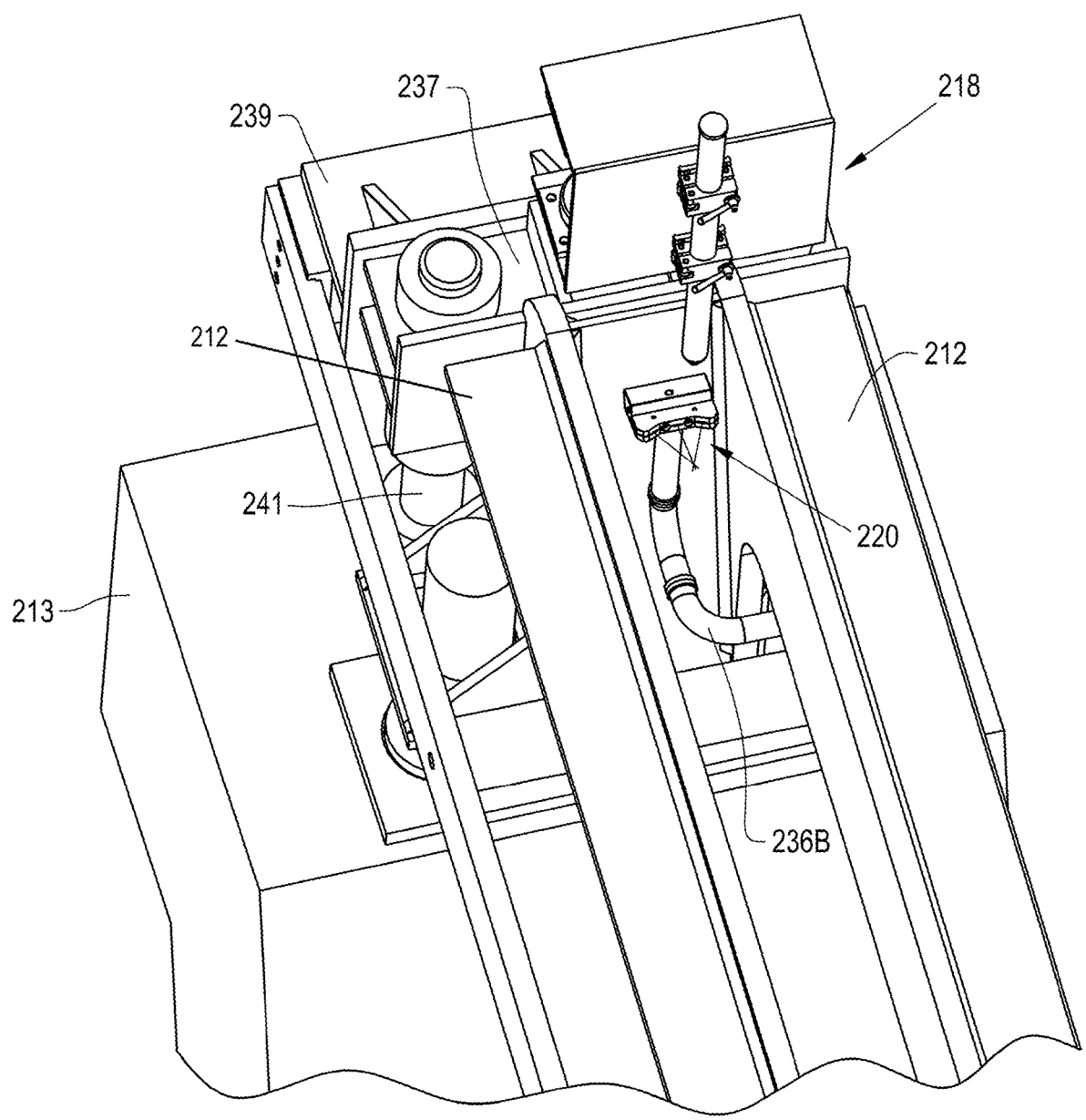

FIGS. 20 through 22 represent and depict various aspects of a nonlimiting embodiment of a second shaping system 110 within the scope of the invention. The second shaping system 110 represented in FIGS. 20 through 22 is similar in general construction and function to the first shaping system 10 of FIGS. 1 through 19. In view of similarities between the second shaping system 110 of FIGS. 20 through 22 and the first shaping system of FIGS. 1 through 19, the following discussion will focus primarily on certain aspects of the second shaping system 110, whereas other aspects not discussed in any detail may be, in terms of structure, function, materials, etc., essentially as was described for the first shaping system 10 of FIGS. 1 through 19. In FIGS. 20 through 22 consistent reference numbers are used to identify components that are the same or functionally related/equivalent to components identified in FIGS. 1 through 19, but with a numerical prefix (1) added to distinguish components depicted in FIGS. 20 through 22 from their counterparts depicted in FIGS. 1 through 19.

Whereas the shaping system 10 of FIGS. 1 through 19 includes the cutting device 18 and the deburring device 20 coupled to the single track system 32 via carriage units 30A and 30B, respectively, the shaping system 110 includes a cutting device 118 coupled to a first track system 132A and a deburring device 120 coupled to a second track system 132B via carriage units 130A and 130B, respectively. The second track system 132B is located within an opening 114 between portions of a table 112 and has tracks on oppositely disposed sides of the table 112 to which the carriage unit 130B is coupled. Two motors 144B enable the carriage unit 130B, and therefore the deburring device 120, to individually and independently move in the travel direction 128 across the slab 116.

The deburring device 120 is preferably connected to the carriage unit 130B via an arm 136B and the carriage unit 130B is preferably adapted to enable the arm 136B to move in vertical directions toward and away from the slab 116 and to move in lateral directions transverse to the longitudinal axis of the table 112. In the embodiment represented in the drawings, vertical movement of the arm 136B relative to the carriage unit 130B can be achieved with a servomotor 155B, and lateral movement of the arm 136B along a track on the carriage unit 130B can be achieved with servomotor 154B, though other means known in the art capable of causing movement in a member or structure are also within the scope of the invention. Preferably, the arm 136B is capable of moving towards and away from the slab 116 and/or oscillating using means such as those described in reference to the first shaping system 10.

Other aspects of the second shaping system 110 not discussed in any detail can be, in terms of structure, function, materials, etc., essentially as was described for the first shaping system 10.

FIGS. 23 through 33 represent and depict various aspects of a nonlimiting embodiment of a third shaping system, referred to below as a cutting system 210, within the scope of the invention. In FIGS. 23 through 33 consistent reference numbers are used to identify components that are the same or functionally related to components identified in FIGS. 1 through 19, but with a numerical prefix (2) added to distinguish components depicted in FIGS. 23 through 33 from their counterparts depicted in FIGS. 1 through 19.

The cutting system 210 includes multiple cutting devices 218 and deburring devices 220 that are coupled to a frame 233. The system 210 includes multiple table systems 221 within the frame 233, each including a table 212 for supporting a slab or plate 216 during a slitting or cutting operation, and one of the deburring devices 220. Track systems 232A and 232B on the frame 233 and the tables 212, respectively, allow the carriage units 230A and 230B, and thereby the cutting and deburring devices 218 and 220, to travel in the travel direction 228.

The cutting devices 218 are located on an arm 236A which bridges the frame 233 in a lateral direction between two bases 234 of the carriage units 230A. Preferably, the individual cutting devices 218 are independently capable of moving along the arm 236A, for example, with servomotors (not shown), in order to position the cutting devices 218 in lateral positions relative to the plate 216. Similarly, the table systems 221 preferably include lateral carriage units 239 coupled to the tables 212 which are independently capable of moving along a track system 245, for example, with servomotors (not shown), in order to position the tables 212 and the deburring device 220 therein in lateral positions relative to the plate 216.

Preferably, the arms 236A and 236B are capable of vertical movement relative to the frame 233. For example, the bases 234A may be capable of raising and lowering the arm 236A relative to the frame 233 using means such as those described in reference to the first shaping system 10. Likewise, the arm 236B may be capable of being raised and lowered using cylinders 241 housed in end frames 237 on oppositely disposed ends of the tables 212, or means such as those described in reference to the first shaping system 10. As best viewed in FIG. 29, the tables 212 may be positioned relative to the frame 233 by extension or retraction of the cylinders 241 housed in end frames 237 on oppositely disposed ends of the tables 212. Once the table systems 221 are in their desired lateral and vertical positions, legs 243 may be extended to contact a support base 213 located below the frame 233 in order to stabilize the tables 212.

While cutting the plate 216, it is preferred that the table systems 221 are individually located such that ends of the plate 216 and areas on oppositely disposed sides of each of the slits 222 are supported by the tables 212, such that all individual portions of the original plate 216 are supported during and at the completion of the cutting operation. Further, each cutting device 221 is preferably operated in conjunction with one of the deburring devices 220 as previously described in reference to FIGS. 1 through 22.

Figure 33:
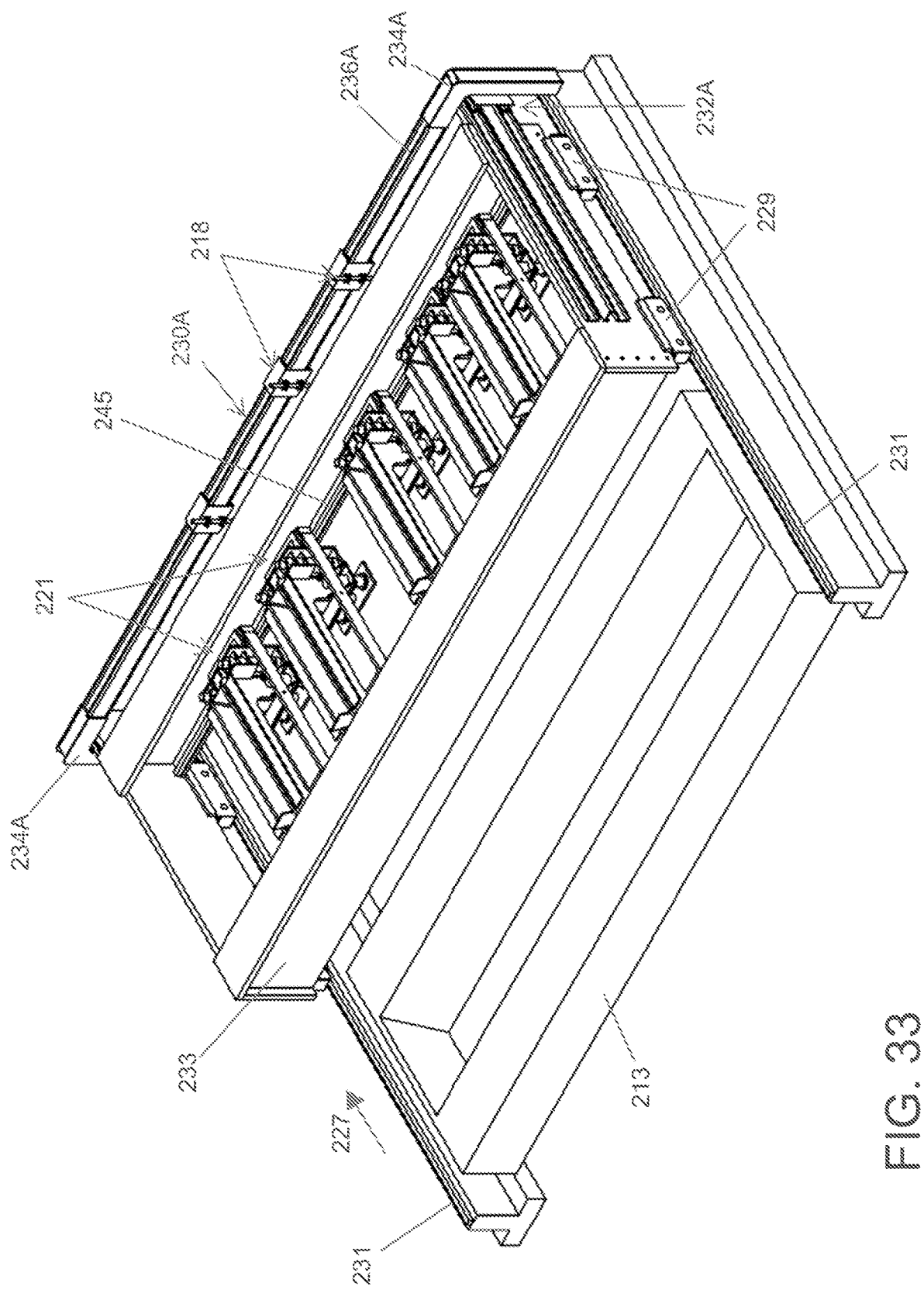
FIG. 33 is a perspective view of the shaping system shown in FIGS. 23 through 27 in a cleaning position.

The support base 213 may include a pit suitable for collecting debris during cutting operations. In order to promote removal of the debris from the pit, the frame 233 is preferably capable of moving away from the pit to expose the debris within the pit. For example, the frame 233 may be located on a track system 231 and capable of moving along the track system 231 via carriage units 229 along a direction 227. It is foreseeable that the frame 233 may be capable of moving in a direction other than 227, for example, the track system 231 could be configured to transport the frame 233 away from the support base 213 in the travel direction 228. FIG. 33 represents the system 210 in an open, cleaning position that provides easy access to the pit in the support base 213.

Other aspects of the cutting system 210 not discussed in any detail can be, in terms of structure, function, materials, etc., essentially as was described for the first and/or second shaping systems 10 and 110.

While the invention has been described in terms of particular embodiments, it is apparent that other forms could be adopted by one skilled in the art. For example, the physical configuration of the systems 10, 110, and 210 and their components could differ from that shown, and materials and processes/methods other than those noted could be used. Therefore, the scope of the invention is to be limited only by the following claims.

The invention claimed is:

1. A cutting system for cutting a material, the cutting system comprising:
   a frame;
   table systems supported by the frame, each of the table systems comprising a table for supporting the material and means for independently moving the table systems relative to the frame in lateral directions;
   at least a first carriage unit and multiple second carriage units supported by the frame and independently operable to travel in a travel direction transverse to the lateral directions, the first carriage unit comprising an arm, the multiple second carriage units comprising arms;
   multiple cutting devices independently movable along the arm of the first carriage unit;
   means for moving the arm and the multiple cutting devices coupled thereto in the travel direction;
   deburring devices coupled to the arms of the multiple second carriage units; and
   means for moving each of the arms of the multiple second carriage units and the deburring devices coupled thereto in the travel direction;
   wherein each of the multiple cutting devices is operated in conjunction with a corresponding one of the deburring devices;
   wherein the means for moving the arm of the first carriage unit and the multiple cutting devices coupled thereto and the means for moving each of the arms of the multiple second carriage units and the deburring devices coupled thereto are independently operable to cause the multiple cutting devices and the deburring devices to simultaneously travel in the travel direction, the first carriage unit and the multiple second carriage units positioning, respectively, the multiple cutting devices and the deburring devices to simultaneously perform multiple cutting and deburring operations, respectively, from opposite surfaces of the material supported on the tables while the deburring devices are behind the multiple cutting devices relative to the travel direction.

2. The cutting system according to claim 1, further comprising extendable legs below each of the table systems and adapted for contacting a support base below the frame to stabilize the tables of the table systems.

3. The cutting system according to claim 1, further comprising cylinders that are coupled to the tables and adapted to extend and retract to position the tables relative to the frame and the material.

4. The cutting system according to claim 1, further comprising means coupled to each of the multiple second carriage units for oscillating the deburring devices in the travel direction.

5. The cutting system according to claim 1, further comprising means for vertically moving the arm of the first carriage unit and means for vertically moving the arms of the multiple second carriage units relative to the frame.

6. The cutting system according to claim 1, wherein each of the deburring devices comprises a manifold comprising at least first and second nozzles adapted to project first and second gas streams therefrom toward a slit in the material formed by the corresponding multiple cutting devices.

7. The cutting system according to claim 6, wherein the first and second nozzles have converging axes so that the first and second gas streams flowing therefrom are directed towards a focal zone but are on different planes.

8. The cutting system according to claim 1, further comprising a laser unit that detects a bow in the material by locating the opposite surfaces of the material when being supported by the table systems, provides feedback to cause automatic adjustment of the multiple cutting devices and the deburring devices to maintain desired distances between the multiple cutting devices and the deburring devices and the opposite surfaces of the material, and provides feedback to position the multiple cutting devices and the deburring devices relative to a side of the material.

9. A cutting system for cutting a material, the cutting system comprising:
   a support base;
   a frame comprising means for moving the frame relative to the support base in first directions between a first position in which the frame is above the support base and a second position in which the frame is not above the support base;
   table systems supported by the frame, each of the table systems comprising a table for supporting the material and means for independently moving the table systems relative to the frame in lateral directions that are transverse to the first directions of the frame;
   at least a first carriage unit and multiple second carriage units supported by the frame and independently operable to travel in a travel direction transverse to the lateral directions, the first carriage unit comprising an arm, the multiple second carriage units comprising arms;
   multiple cutting devices independently movable along the arm of the first carriage unit;
   means for moving the arm and the multiple cutting devices coupled thereto in the travel direction;
   deburring devices coupled to the arms of the multiple second carriage units; and
   means for moving each of the arms of the multiple second carriage units and the deburring devices coupled thereto in the travel direction;
   wherein each of the multiple cutting devices is operated in conjunction with a corresponding one of the deburring devices;
   wherein the means for moving the arm of the first carriage unit and the multiple cutting devices coupled thereto and the means for moving each of the arms of the multiple second carriage units and the deburring devices coupled thereto are independently operable to cause the multiple cutting devices and the deburring devices to simultaneously travel in the travel direction, the first carriage unit and the multiple second carriage units positioning, respectively, the multiple cutting devices and the deburring devices to simultaneously perform multiple cutting and deburring operations, respectively, from opposite surfaces of the material supported on the tables while the deburring devices are behind the multiple cutting devices relative to the travel direction.

10. The cutting system according to claim 9, further comprising extendable legs below each of the table systems and adapted for contacting the support base below the frame to stabilize the tables of the table systems.

11. The cutting system according to claim 9, further comprising cylinders that are coupled to the tables and adapted to extend and retract to position the tables relative to the frame and the material.

12. The cutting system according to claim 9, further comprising means coupled to each of the multiple second carriage units for oscillating the deburring devices in the travel direction.

13. The cutting system according to claim 9, further comprising means for vertically moving the arm of the first carriage unit and means for vertically moving the arms of the multiple second carriage units relative to the frame.

14. The cutting system according to claim 9, wherein each of the deburring devices comprises a manifold comprising at least first and second nozzles adapted to project first and second gas streams therefrom toward a slit in the material formed by the corresponding multiple cutting device.

15. The cutting system according to claim 14, wherein the first and second nozzles have converging axes so that the first and second gas streams flowing therefrom are directed towards a focal zone but are on different planes.

16. The cutting system according to claim 9, further comprising a laser unit that detects a bow in the material by locating the opposite surfaces of the material when being supported by the table systems, provides feedback to cause automatic adjustment of the multiple cutting devices and the deburring devices to maintain desired distances between the multiple cutting devices and the deburring devices and the opposite surfaces of the material, and provides feedback to position the multiple cutting devices and the deburring devices relative to a side of the material.

17. The cutting system according to claim 9, wherein the support base comprises a pit for collecting debris from the material when the frame is in the first position above the support base, and the pit is accessible when the frame is in the second position in which the frame is not above the support base.

18. A method of cutting a material using the cutting system of claim 9, the method comprising:
   positioning the tables by independently moving the table systems relative to the frame in the lateral directions;
   stabilizing the tables with the support base;
   placing the material on the tables; and
   independently operating the first carriage unit and the multiple second carriage units to travel in the travel direction while operating the multiple cutting devices and the deburring devices to simultaneously perform the multiple cutting and deburring operations, respectively, from the opposite surfaces of the material and thereby cut the material into individual portions.

19. The method of claim 18, wherein the material is a steel slab or plate.

20. The method of claim 18, wherein the table systems are individually located during the positioning of the tables such that all cuts are made in the material between adjacent pairs of the table systems, and all individual portions of the material are supported by the tables during and at completion of the cutting operations.

* * * * *